US009754055B1

(12) United States Patent
Glendinning et al.

(10) Patent No.: US 9,754,055 B1
(45) Date of Patent: Sep. 5, 2017

(54) SYSTEM, METHOD, AND COMPUTER PROGRAM PRODUCT FOR MANAGING AN AREA FOR POSITIONING RESOURCES, BASED ON PARAMETERS OF THE RESOURCES

(75) Inventors: Graham Glendinning, Bradford-on-Avon (GB); David Barton, Bath (GB); Paul McCluskey, Arlington, VA (US)

(73) Assignees: Amdocs Software Systems Limited, Dublin (IE); Amdocs Development Limited, Limassol (CY)

(*) Notice: Subject to any disclaimer, the term of this patent is extended or adjusted under 35 U.S.C. 154(b) by 1607 days.

(21) Appl. No.: 12/436,688

(22) Filed: May 6, 2009

(51) Int. Cl.
*G06F 17/50* (2006.01)
*G06T 17/00* (2006.01)
*G06Q 10/06* (2012.01)

(52) U.S. Cl.
CPC .......... *G06F 17/5004* (2013.01); *G06F 17/50* (2013.01); *G06F 2217/78* (2013.01); *G06Q 10/06313* (2013.01); *G06T 17/00* (2013.01)

(58) Field of Classification Search
CPC .. G06F 17/5004; G06F 17/50; G06F 2217/78; G06Q 10/06; G06Q 10/06313; G06T 17/00
USPC ......................... 703/5, 6; 707/999.1; 715/734
See application file for complete search history.

(56) References Cited

U.S. PATENT DOCUMENTS

| | | | | |
|---|---|---|---|---|
| 4,630,219 A | * | 12/1986 | DiGiacomo et al. | 716/123 |
| 5,461,709 A | * | 10/1995 | Brown | 715/848 |
| 5,850,539 A | * | 12/1998 | Cook et al. | 703/20 |
| 5,991,759 A | * | 11/1999 | Knoblock | H04Q 3/54533 |
| 6,169,987 B1 | * | 1/2001 | Knoblock et al. | |
| 6,384,842 B1 | * | 5/2002 | DeKoning et al. | 715/734 |
| 6,925,573 B2 | * | 8/2005 | Bodas | 713/320 |
| 7,698,114 B2 | * | 4/2010 | Hamann et al. | 703/5 |
| 7,885,795 B2 | * | 2/2011 | Rasmussen et al. | 703/5 |
| 8,053,926 B2 | * | 11/2011 | Lehmann et al. | 307/64 |
| 2004/0088145 A1 | * | 5/2004 | Rosenthal | G06F 17/509 703/1 |
| 2006/0161307 A1 | * | 7/2006 | Patel et al. | 700/277 |
| 2006/0206730 A1 | * | 9/2006 | Cartes et al. | 713/300 |
| 2007/0038414 A1 | * | 2/2007 | Rasmussen | G06F 17/5004 703/1 |
| 2007/0078635 A1 | * | 4/2007 | Rasmussen et al. | 703/1 |
| 2009/0138313 A1 | * | 5/2009 | Morgan et al. | 705/8 |
| 2009/0150123 A1 | * | 6/2009 | Archibald et al. | 703/1 |
| 2009/0150129 A1 | * | 6/2009 | Archibald et al. | 703/5 |
| 2009/0150133 A1 | * | 6/2009 | Archibald et al. | 703/9 |
| 2009/0150472 A1 | * | 6/2009 | Devarakonda et al. | 709/201 |
| 2009/0210813 A1 | * | 8/2009 | Sawczak et al. | 715/771 |
| 2009/0211773 A1 | * | 8/2009 | Gooch | 169/46 |
| 2009/0309570 A1 | * | 12/2009 | Lehmann et al. | 323/318 |
| 2009/0326879 A1 | * | 12/2009 | Hamann et al. | 703/2 |
| 2009/0326884 A1 | * | 12/2009 | Amemiya et al. | 703/6 |

(Continued)

*Primary Examiner* — Akash Saxena

(74) *Attorney, Agent, or Firm* — Zilka-Kotab, PC

(57) ABSTRACT

A system, method, and computer program product are provided for generating a view of an area for positioning resources, based on parameters of the resources. In operation, one or more planned resources to be located in an area are identified. Additionally, at least one parameter of each of the one or more planned resources is determined. Furthermore, a view of the area is generated including possible locations to position the one or more planned resources, based on the at least one parameter.

35 Claims, 24 Drawing Sheets

(56) References Cited

U.S. PATENT DOCUMENTS

| | | | |
|---|---|---|---|
| 2010/0082309 A1* | 4/2010 | Dawson et al. | 703/6 |
| 2010/0106464 A1* | 4/2010 | Hlasny et al. | 703/1 |
| 2010/0179695 A1* | 7/2010 | Collins et al. | 700/276 |
| 2010/0256959 A1* | 10/2010 | Vangilder et al. | 703/6 |
| 2010/0280796 A1* | 11/2010 | Ramin et al. | 702/188 |
| 2010/0286955 A1* | 11/2010 | VanGilder | G06F 17/5009 702/182 |
| 2010/0287018 A1* | 11/2010 | Shrivastava et al. | 705/8 |
| 2011/0010151 A1* | 1/2011 | Archibald et al. | 703/5 |
| 2012/0109619 A1* | 5/2012 | Gmach et al. | 703/21 |
| 2012/0278045 A1* | 11/2012 | Saigo | G06Q 10/06 703/1 |
| 2013/0103440 A1* | 4/2013 | Imani | G06Q 10/06 705/7.11 |
| 2016/0277715 A1* | 9/2016 | Mankovskii | G06F 17/5004 |
| 2017/0091348 A1* | 3/2017 | Barajas Gonzalez | G06F 17/5004 |

* cited by examiner

SYSTEM, METHOD, AND COMPUTER PROGRAM PRODUCT FOR MANAGING AN AREA FOR POSITIONING RESOURCES, BASED ON PARAMETERS OF THE RESOURCES

FIELD OF THE INVENTION

The present invention relates to site planning, and more particularly to site planning based on capacity.

BACKGROUND

Planning the use of physical space is becoming increasingly important as space for positioning resources becomes less plentiful and more expensive. For example, planning the allocation of space in a facility for network devices is becoming increasingly important as the number of network devices become larger and the space of the facility becomes smaller.

In addition to planning the usage of physical space of a facility, resource use of the facility must be planned. For example, such facility may be limited in power capacity. Thus, when planning the positioning of devices, both the power capacity of the facility and the physical space of the facility should be considered.

Currently, capacity planning and the planning of physical space are addressed separately. In these cases, capacity management considerations and restrictions are not fully integrated into the resource planning.

Additionally, there is usually no easy way to retrieve affected services due to power outage, or cooling failure. There is thus a need for addressing these and/or other issues associated with the prior art.

SUMMARY

A system, method, and computer program product are provided for generating a view of an area for positioning resources, based on parameters of the resources. In operation, one or more planned resources to be located in an area are identified. Additionally, at least one parameter of each of the one or more planned resources is determined. Furthermore, a view of the area is generated including possible locations to position the one or more planned resources, based on the at least one parameter.

BRIEF DESCRIPTION OF THE DRAWINGS

FIGS. 6A-6K show a method and user interfaces for creating a site, in accordance with one embodiment.

FIGS. 7A-7F show a method and user interfaces for placing resources, in accordance with one embodiment.

DETAILED DESCRIPTION

Figure 1:
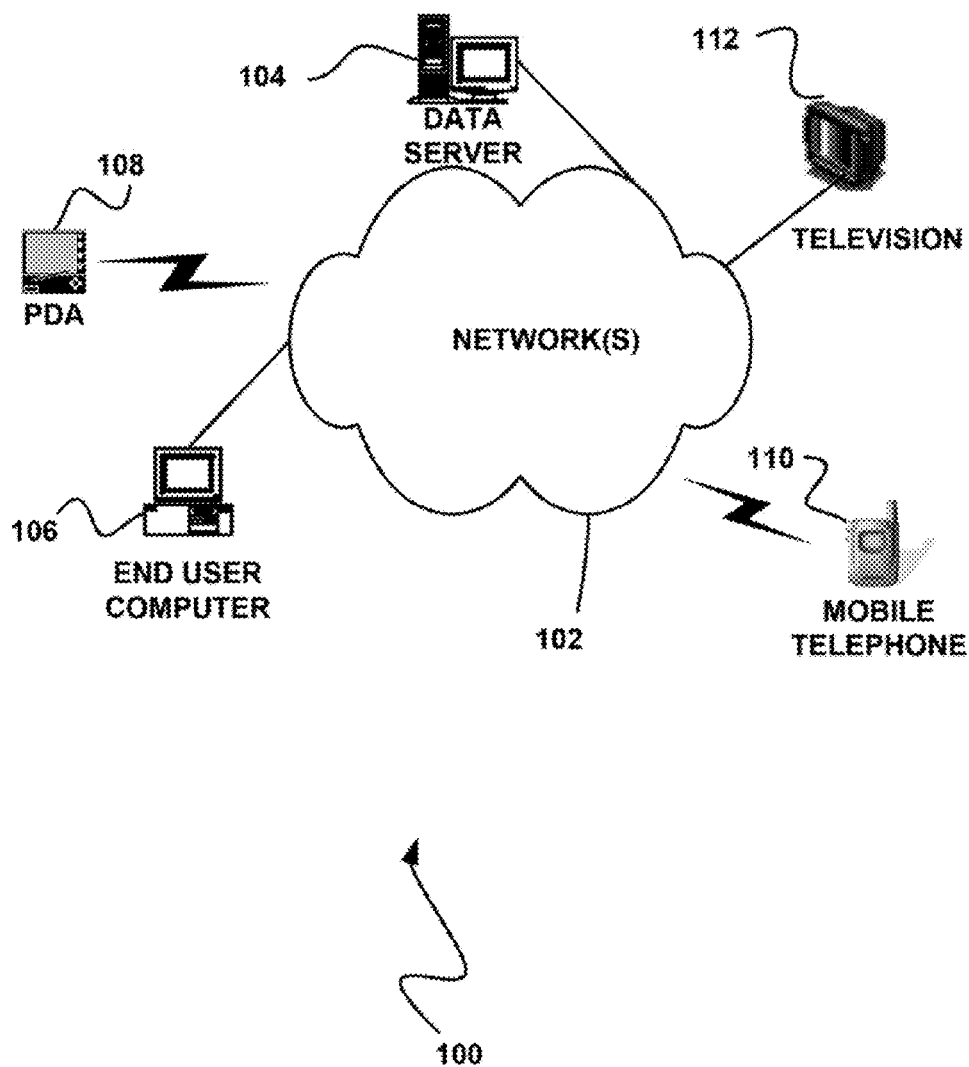
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
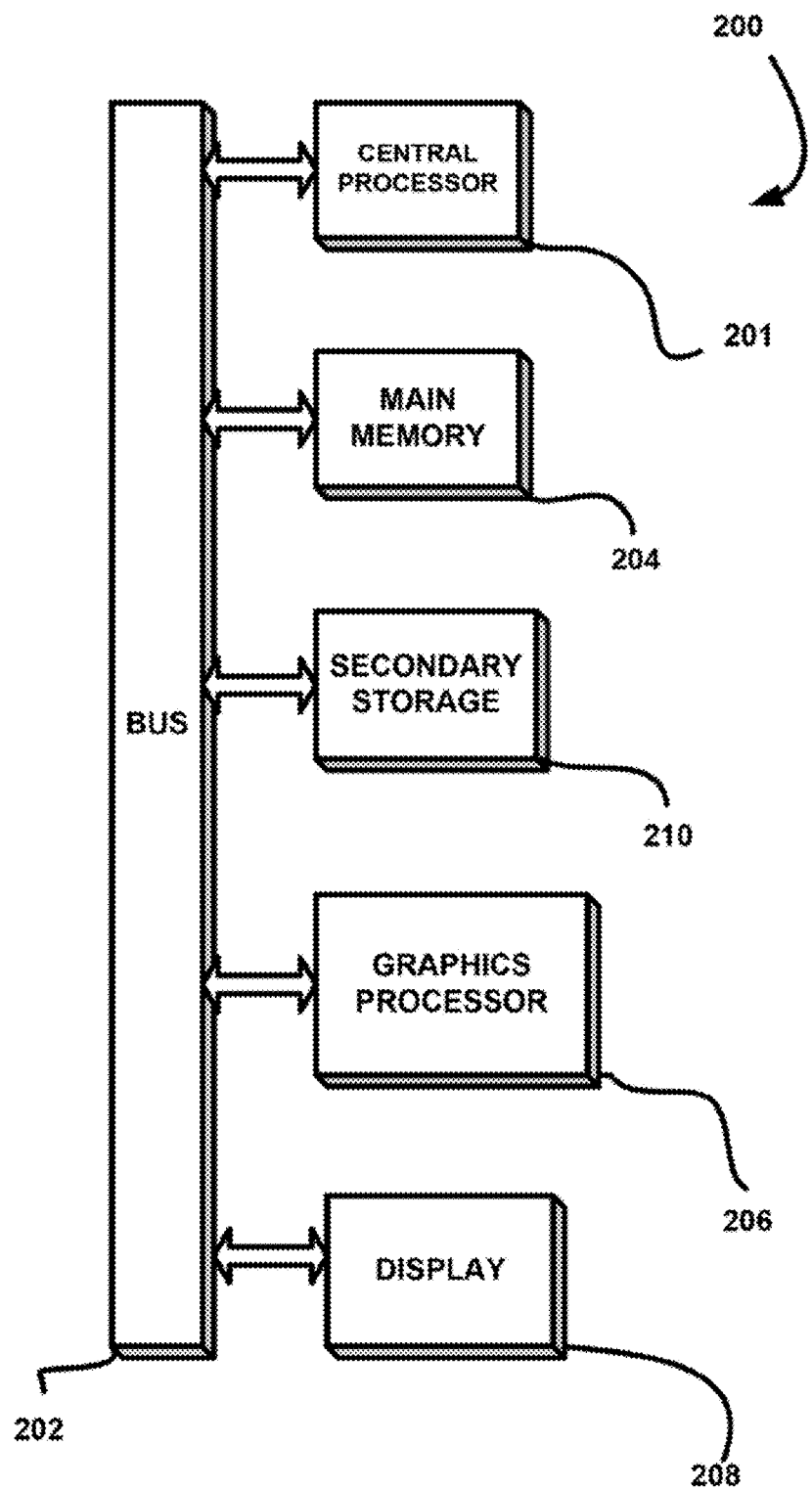
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
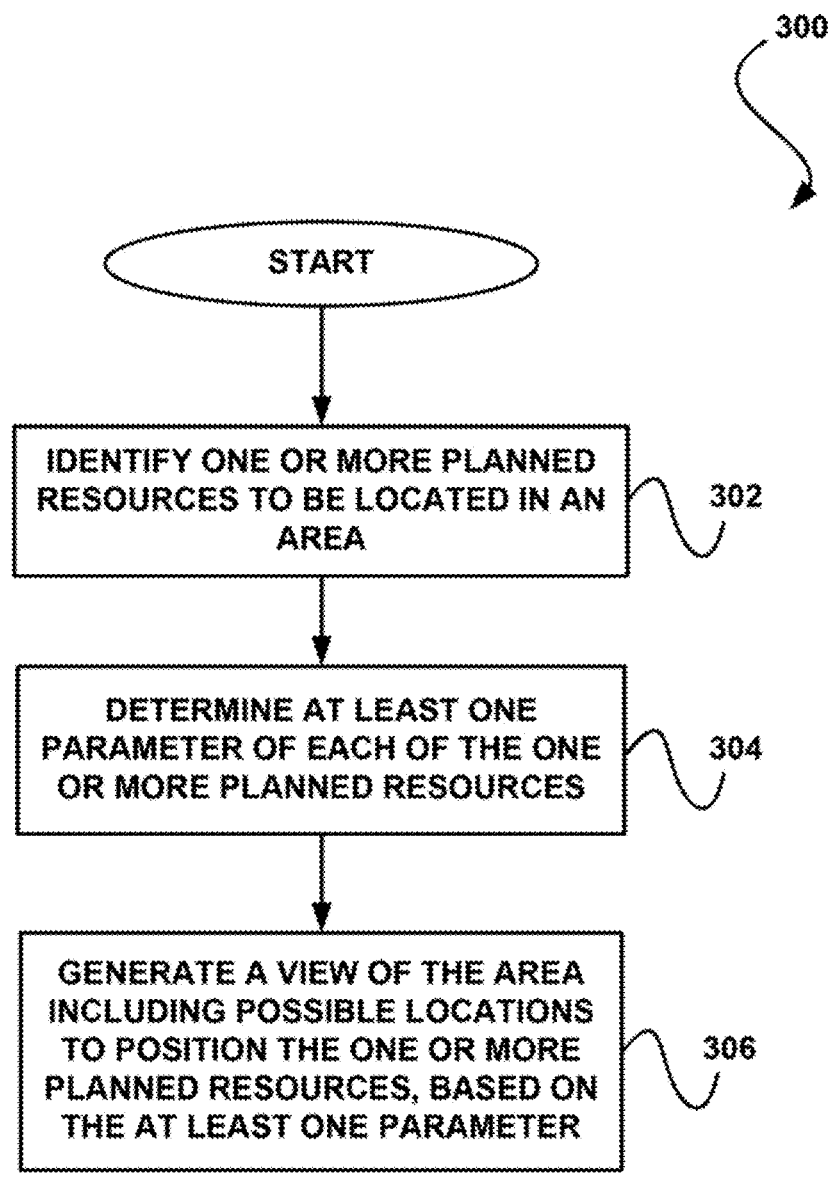
FIG. 3 shows a method for generating a view of an area for positioning resources, based on parameters of the resources, in accordance with one embodiment.

FIG. 3 shows a method 300 for generating a view of an area for positioning resources, based on parameters of the resources, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

In operation, one or more planned resources to be located in an area are identified. See operation 302. As an option, a user may identify the planned resources to be located in the area. In this case, the user may identify the planned resources using a user interface.

In the context of the present description, a planned resource refers to any device that may be physically positioned in an area. For example, in various embodiments, the planned resource may include, but is not limited to, an electronic device such as a server, an end user computer, a monitor, machinery, a phone, a power supply, a power rack, a fan, a cooling device, a heating device, and/or any other device. Additionally, the planned resource may include any non-electronic device such as a rack, a cabinet, a heat sink, a desk, and/or any other non-electronic device.

The area may include any space capable of including the planned resource. In one embodiment, the area may include a site (e.g. an exchange, a central office, etc.). In various embodiments, the site may include at least one room, at least one floor of a building, a building, and/or any other area. In one embodiment, a user may be capable of defining one or more attributes associated with the area.

The attributes may include any attribute associated with the area. For example, the attributes may include a size, a layout, a temperature, a power availability, and/or any other attribute. As an option, the user may define the area and/or attributes associated therewith using a user interface.

As shown further in FIG. 3, at least one parameter of each of the one or more planned resources is determined. See operation 304. In the context of the present description, a parameter refers to any characteristic of a resource.

For example, in one embodiment, the parameter may include a physical space requirement of each of the planned resources. In another embodiment, the parameter may include a power requirement of each of the planned resources. In still another embodiment, the parameter may include a cooling requirement of each of the planned resources.

In yet another embodiment, the parameter may include a weight requirement of each of the planned resources. Of course, the parameter may include any characteristic of a resource and is not limited to a physical parameter. For example, in one embodiment, the parameter may include an ownership of a device. As an option, the ownership of the device may be utilized in the context of zone building.

Furthermore, a view of the area is generated including possible locations to position the one or more planned resources, based on the parameter. See operation 306. In one embodiment, the view of the area may include a 2-dimensional view of the area, as a plan or elevation view.

In another embodiment, the view of the area may include a 3-dimensional view of the area. In either case, the view of the area may show any possible location to position the planned resource. The possible locations may include any location where the planned resource may be placed, based on the parameters.

In one embodiment, the possible locations may include a preferred location, based on the parameter. In this case, the preferred location may include a recommend location to place the resources. This may be based both on the parameter and the characteristics of the area.

Still yet, the possible locations may include a physically possible location. In this case, the physically possible location may include a location where it is physically possible to place the resource. In this case, this location may not necessarily be a preferred or recommended location.

In one embodiment, however, all possible locations may be displayed, including preferred locations. These locations may include any location where the resources may be placed, based on the parameters and/or the characteristics of the area.

For example, in one embodiment, the possible locations to position the planned resources may include at least one cabinet. In another embodiment, the possible locations to position the planned resources may include at least one floor.

In still another embodiment, the possible locations to position the planned resources may include at least one wall.

As an option, capacity controlling polygons may be capable of being utilized to control positioning of the one or more planned resources. Furthermore, the view may include a visualization of routes within a site with respect to the one or more planned resources and one or more boundaries (e.g. site boundaries, etc.).

As an option, once the view of the area is generated including possible locations to position the planned resources, the view of the area may be displayed including the possible locations to position the one or more planned resources. In this case, the view may be displayed to a user using a user interface. In this way, a user may be allowed to graphically position the one or more planned resources in the view of the area.

For example, in one embodiment, a user may be allowed to manage the area utilizing the view. As an option, the view may display a current capacity usage. Furthermore, in one embodiment, a report of the current capacity usage may be generated.

In this case, the report may be generated automatically (e.g. based on an event, etc.), or based on a user action. As another option, a report may be generated of services affected by one or more failures associated with the area. As an option, managing the area may include managing a capacity usage to reduce incidences of a failed deployment.

It should be noted that, as an option, a user may be capable of defining any site-based capacity to be controlled. In this case, the site-based capacity may include a zone type, a behavior algorithm, or capacity algorithm. A behavior algorithm refers to any algorithm capable of defining a behavior of an object. Similarly, a capacity algorithm refers to any algorithm capable of defining a capacity.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
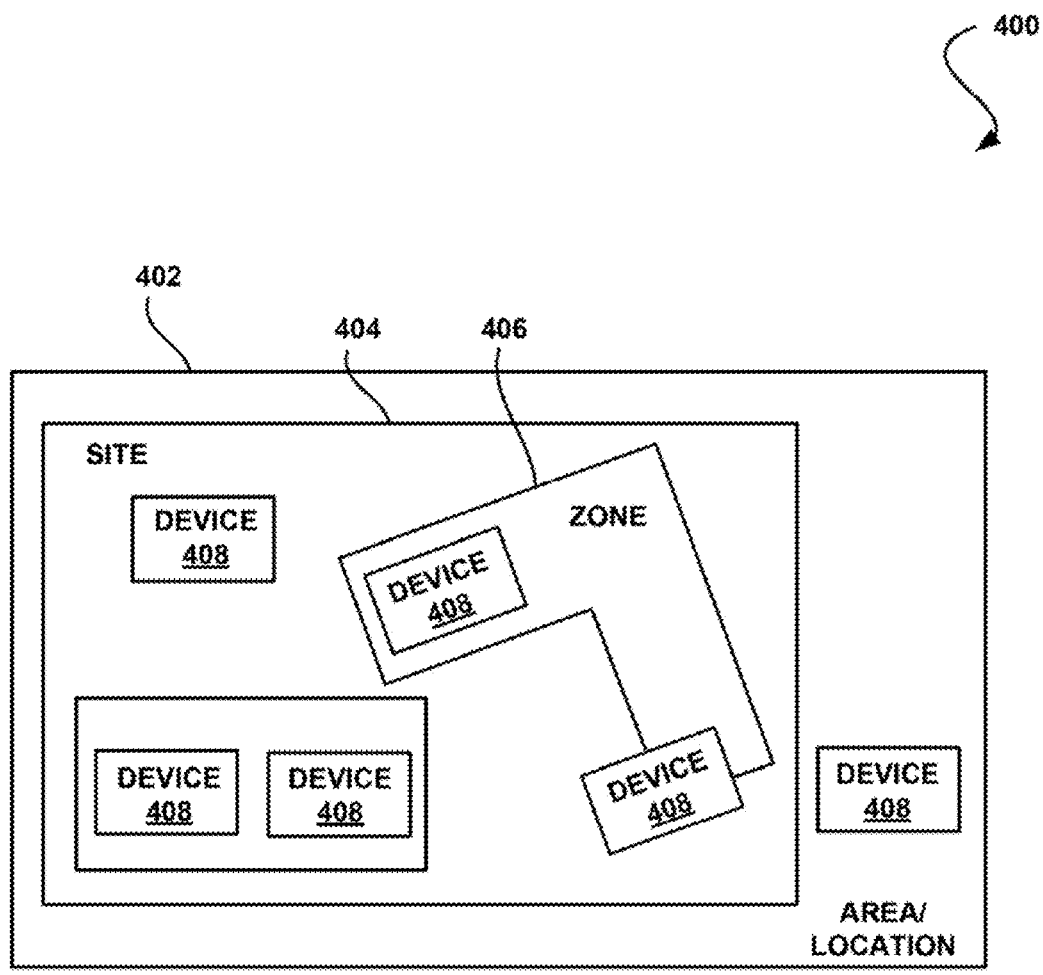
FIG. 4 shows a view of an area including possible locations to position one or more planned resources, based on at least one parameter, in accordance with one embodiment.

FIG. 4 shows a view 400 of an area 402 including possible locations to position one or more planned resources 408, based on at least one parameter, in accordance with one embodiment. As an option, the view 400 may be implemented in the context of the details of FIGS. 1-3. Of course, however, the view 400 may be implemented in any desired environment. Again, the aforementioned definitions may equally apply to the description below.

As shown, the area 402 may include one or more sites 404 and/or zones 406. The view 400 may be displayed such that a user may plan and place the resources 408 in a location that is desirable based on parameters of the resources 408, the zone 406, the site 404, and/or the area 402. Furthermore, the user may have the ability to define parameters associated with the resources 408, the zone 406, the site 404, and/or the area 402.

It should be noted that, in one embodiment, a user may have the ability to define types of sites and types of zones. In this case, the types of zones may define their behavior in terms of capacity control. In one embodiment, these types may be added through a configuration utility. In addition to adding these zones, and defining their capacity managed behavior, the calculation for capacity may be configurable for the user (e.g. a customer, etc.). Furthermore, a configuration may be provided for power and cooling zones, balancing the supplied versus the required capacity. This may be extended to include any zone types, whose capacity is to be controlled.

In this way, a logical view of physical capacity (e.g. power, space, cooling, weight, etc.) may be managed in a single system including a user interface for network planning, fulfillment, and assurance. This enables site definition and control of device placement decisions to be taken at network design time, reducing rework and failed truck rolls. Furthermore, capacity controlling may be implemented as a flexible zone that is placed on a canvas of a site with associated objects consuming and supplying resources. Using this interface, space, power, and cooling can be managed on walls, floors, and inside racks and cabinets.

Additionally, the user interface may provide a user with a schematic view of a room or data center and may allow the user to place devices within that room. In this case, cooling capacity may be captured and balanced with nodal heat output. Further, power supplies may be balanced with nodal power requirements.

Thus, a site planner user interface may be implemented that enables the capacity management of sites, which may represent areas and buildings at network locations. In this case, sites may be defined in terms of the amenities they supply to devices in the location, such that efficient use of the site may be planned.

In one embodiment, in order to carry out site planning activities, the site planner may introduce a set of additional tools and features to a user interface for managing resources. As an option, a user interface (e.g. a site planning wizard, etc.) may be utilized to carry out the site planning activities.

Using this interface, a user may define zones and sites, as well as zone objects and site objects. In this case, zones may refer to specific areas within a boundary of a site, whose characteristics represent capacity. Zone types may determine where devices may be placed in the site. For example, devices may be oriented within a zone to fit a specific area. The user interface may use the device objects 408 to represent physical units within a site 404, as shown in FIG. 4.

A zone may have an enclosed perimeter, a zone type, and a sub type. Furthermore, a zone may be capacity managed such that a flag is utilized to indicate whether the zone represents capacity such as power supply or cooling. It should be noted that not all zones may be capacity managed. For example, fire protection zones and prohibited zones may not be capacity managed.

In one embodiment, site planner related metadata such as power and cooling supplied, power and cooling required, external dimensions, etc. may be defined for card types and node types. As an option, the site planner user interface may use metadata callouts defined in table fields in a database.

Additionally, using the user interface, the user may be allowed to select wizards to create and modify sites. Further, schematic views of sites and zones may be utilized to give spatial context, such that the placement of devices in specific positions within the boundary of the site may be visualized.

In one embodiment, the boundary of a site may be used to gauge the physical area in which zones may be created and devices placed. In this case, site capacity may be controlled by the zones created within its boundary. The capacity may be measured in terms of the delivery of functional requirements to the devices placed within a zone.

For example, a zone may be defined with a limit to the cooling capacity or power it is able to provide to devices. If cooling capacity is defined, then the heat output of devices placed within the site may be taken into account such that a maximum threshold need not be exceeded. Similarly, power may be available only in certain zones and have a maximum amount available to supply to devices.

In this case, a site may represent any building or an area within a building at a specific location, where device placement may be capacity controlled. In one embodiment, zones may be defined within a site, indicating a specific usage or capacity restriction. As noted above, a zone may have a behavior that determines whether a device should be placed in the zone. As an option, a zone may be defined so that specific device allocation is mandatory, or it can be declared a prohibited zone.

As another option, zones that allow device placement may have a defined capacity so that the optimal allocation of devices may be gauged for a particular area. Additionally, the boundary of sites and zones may be defined using perimeters. In this case, a user may define the boundary of sites and zones using the user interface. As an option, zones may overlap, allowing zones of different types to cover the same physical area of the site.

The user interface may also allow sites to be defined and interpreted schematically. In one embodiment, sites may be created using a user interface such as a site wizard. In this case, when a site is defined, coverage may be established, with a defined boundary. As an option, zones may then be applied to the site, which control how precise areas of the site may be used.

Figure 5:
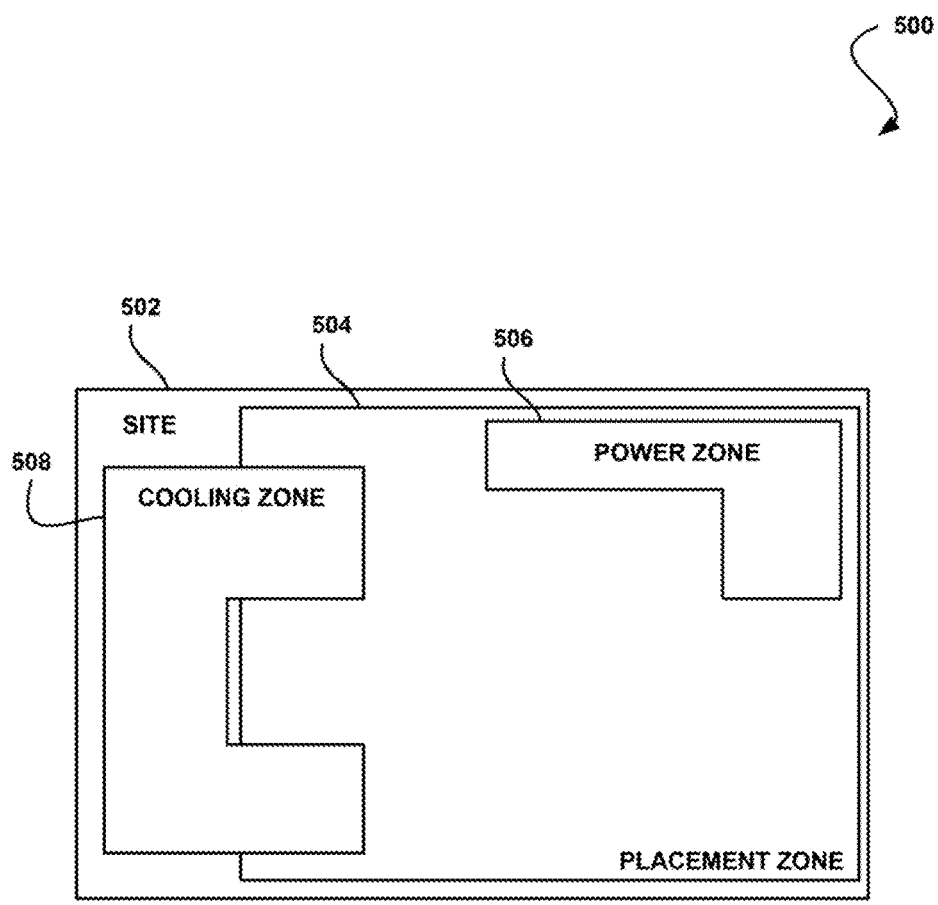
FIG. 5 shows a view of an example site with three zones defined to represent different areas of function, in accordance with one embodiment.

FIG. 5 shows a view 500 of an example site with three zones defined to represent different areas of function, in accordance with one embodiment. As an option, the view 500 may be implemented in the context of the details of FIGS. 1-4. Of course, however, the view 500 may be implemented in any desired environment. Further, the aforementioned definitions may equally apply to the description below.

As shown, the view 500 includes a site 502. The site 502 includes a placement zone 504, a power zone 506, and a cooling zone 508. The zones defined in this embodiment may represent the constraints that apply to particular areas. The constraints may affect where a device may be practicably placed within the site. In one embodiment, the view 500 may further illustrate preferred locations to place devices.

As an option, perimeters may be set for sites and zones within sites to delineate their boundaries. In one embodiment, a perimeter may be represented by a polygon drawn using a site planner user interface by joining a set of points on a canvas to determine the site boundary. In this case, the site may represent the space and capacity in an area where devices may be placed.

Coverage of a site may denote its physical space, as well as the availability and usage of that space. In one embodiment, the sites may be configured such that zones and devices may not extend beyond the site boundary. As an option, the site planner user interface may include a predefined site type that represents a floor plan.

As noted, a zone may refer to an area in a site that represents a single continuous polygon covering part or the entire site. In one embodiment, zones may freely overlap other zones within a site. As an option, the zone area may represent a bay for device placement or the extent of potential power supply.

The zone may also provide capacity restrictions on device placement. In this way, zones may be utilized to control placement, as well as mark fixed areas such as fire protection zones. In one embodiment, zones may be defined so that devices may overlap the boundary of the zone. In this case, each zone may have specific settings that define how they operate in terms of legitimacy, capacity management, and device overlap.

A legitimacy behavior may control whether it is permissible to place devices within a zone. In various embodiments, the legitimacy behavior may include an obligatory classification, a prohibited classification, and an optional classification. In this case, the obligatory classification may indicate that devices must be placed in the zone or another zone with the same behavior within a site, or site resolution may be affected.

The prohibited classification may indicate that devices cannot be placed within the zone, or site resolution may be affected. The optional classification may indicate that devices may optionally be placed within the zone.

In one embodiment, zones may be defined such that they are capacity managed. The capacity may be a measurement associated with a zone that is supplied to objects in that zone. The capacity may represent a function performed in the zone, such as power or cooling supply.

In one embodiment, the capacity may be automatically recalculated each time a device is added to or removed from an area. Furthermore, a device may be positioned in any legitimate zone, site, or area, if there is sufficient remaining capacity. As another option, the zone may be configured so that capacity may be over allocated.

A device type may consume or add to the capacity of a site. In various embodiments, the supply of capacity to devices may be explicit or implicit. In this case, when a device is placed in a zone, site, or area, the function (e.g. power or cooling, etc.) supplied by the zone to the device may be expressed implicitly or explicitly. In the case that the capacity is implicit, capacity supplied from the zone may be declared automatically, without the need for specific association when a device is placed in the zone. For example, a cooling zone may serve its function implicitly.

In the case that the capacity is explicit, capacity supplied from the zone may be allocated when a relationship is created between the zone and the device. For example, a power zone may serve its function explicitly. Whether implicit or explicit, the capacity for the zone may be recalculated when a new device is associated with that zone. When devices are placed in the zone and breach the limit of the zone capacity, the zone resolution may also be affected.

As an option, the resolution of a zone that is capacity managed may indicate whether its capacity is over allocated or that there is capacity available in terms of device placement. For example, in various embodiments, zone capacity resolution may be under allocated, fully allocated, or over allocated. In one embodiment, icons or other indicators on the site planner user interface may indicate the resolution of a zone. Zones that are not capacity managed may not necessarily display an icon or other indicator.

In one embodiment, zones may be permitted to overlap other zones. In this case, if zones overlap, devices placed in an area where the zones intersect may have to satisfy the restrictions of all of the zones. As an option, device overlap behavior may determine whether a device may overlap a zone boundary.

In various embodiments, the user interface may provide a user with various types of zone options. For example, in various embodiments, the user may have the ability to define zones and/or may have access to placement zones, power zones, cooling zones, fire protection zones, prohibited zones, preferred zones, and/or various other zones.

In this case, placement zones refer to areas where devices may be placed. As an option, these zones may be drawn to define the surface area for rows of equipment or individual devices. For example, walkways and areas around fire escapes may not be included in placement zones. As an option, the placement zone may have a subtype of "standard" to define areas for specific device groupings within a zone.

In one embodiment, the area of power distributed to devices may be represented by a power zone, which may be associated with devices representing the equipment that supply the power and those that consume the power. In this case, power zones may capture the power provided by one or more electricity suppliers and the electrical equipment needed for the devices to function.

As an option, the power zone may have a subtype of "power supply" to define areas for specific power supplies and electrical connectors. In one embodiment, devices may be supplied explicitly by a power zone, just as they would require a physical electrical connection in the real world. In this case, the devices that represent the power supplied to a power zone must be in the same location as the power zone, but may not be required to be in the site.

In one embodiment, a cooling zone may represent an area within a site where temperature is regulated. For example, rooms that hold telecom equipment may be required to keep the machinery within its operating temperature range. This may be achieved using air conditioning or water cooling equipment that supplies the temperature regulation to the cooling zone.

Cooling capacity may be balanced against the heat generated by devices that are positioned within the cooling zone as consumers. The extent of a cooling zone representing air conditioning might stretch to an entire room, and any device within the room may benefit from the cooling effect. In one embodiment, the cooling zone may have a subtype of "cooling area" to define areas for specific cooling equipment.

It should be noted that the power zone calculations and the cooling zone calculations may be configurable calculations. For example, in the context of cooling zones, the user may modify a cooling area to include thermal gain through windows, heat loss through door openings, etc.

Cooling zones may have a similar configuration as power zones, as there are contributing and consuming devices related to cooling zones. In the case of cooling zones, however, devices may be supplied implicitly by a cooling zone, so that an association need not be specified.

In one embodiment, a fire protection zone may represent an area that has been demarcated for safety reasons. As an option, no capacity management may take place in a fire protection zone. The fire protection zone may have a subtype of "standard" to define rooms that need to be sealed off in case of a fire.

A prohibited zone may represent an area that should remain vacant. In this case, a user may be warned of any device placement. Additionally, capacity management may not occur in a prohibited zone. The prohibited zone may have a subtype of "standard" to define areas, such as walkways, that need to be left free of devices.

FIGS. 6A-6K show a method 600 and user interfaces for creating a site, in accordance with one embodiment. As an option, the method 600 may be implemented in the context of the details of FIGS. 1-5. Of course, however, the method 600 may be carried out in any desired environment. Again, the aforementioned definitions may equally apply to the description below.

As shown, a user elects to create or modify a site using a user interface. See operation 602. In one embodiment, the user interface may be implemented as a site planner wizard capable of being utilized to create a site and its associated zones and to define their perimeters. In this case, the site wizard may be utilized to create or modify an area, modify a site, create or modify the zones in a site, and place resources within zones, sites, or areas.

Figure 6A:
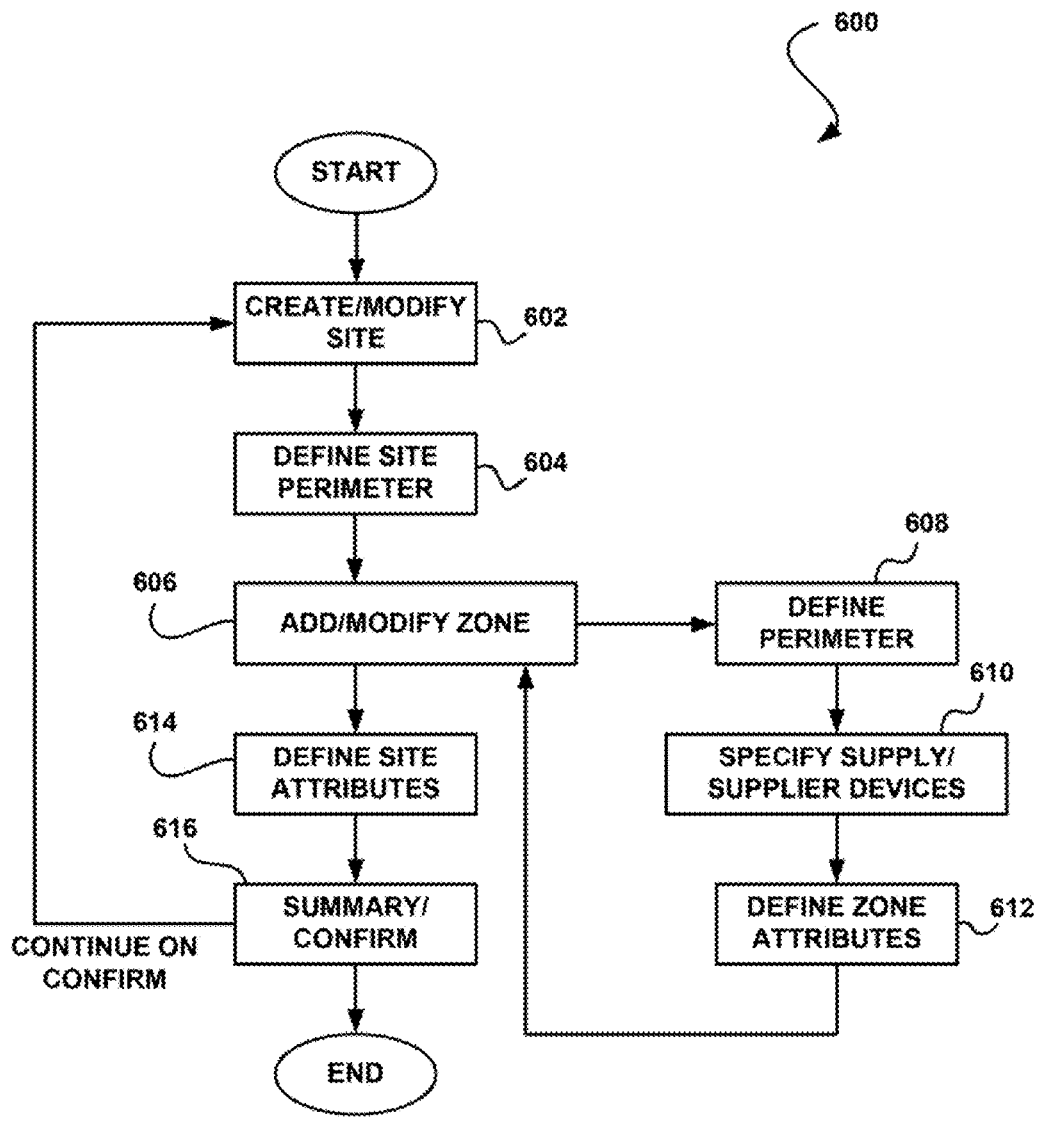
Figure 6B:
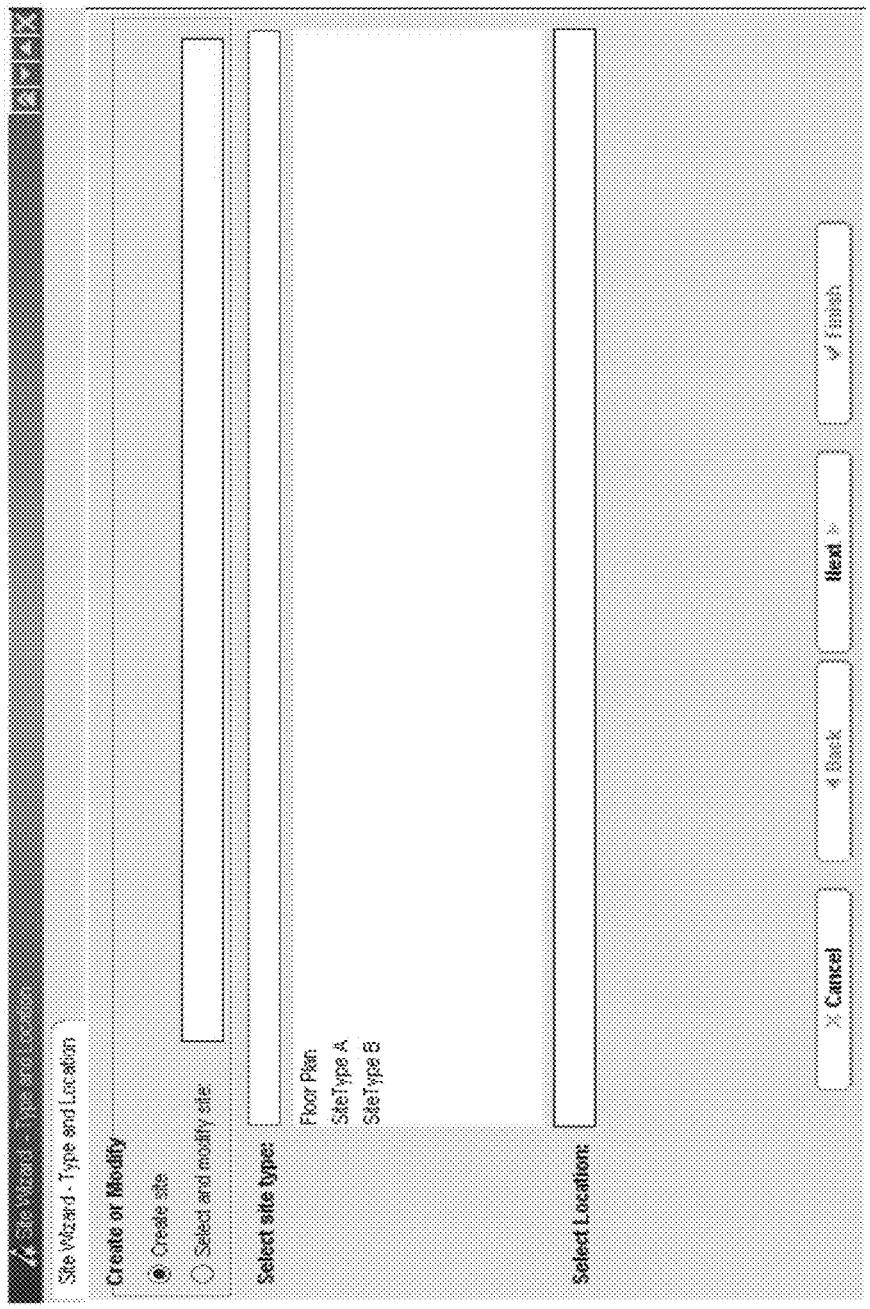

To create a site, the user may access the site planner user interface. In this case, a type and location interface associated with the site planner user interface may be displayed. FIG. 6B shows a type and location interface associated with the user interface, in accordance with one embodiment.

In one embodiment, this interface may be utilized to modify a site by clicking a select and modify site option and selecting a site. In various embodiments, a user may enter the name of the site directly or select a name from the user interface. As an option, a user may also search for a site using a find option. The search may include utilizing various search criteria. For example, when searching for a site, the user may have the option to enter a percentage symbol (%) as a wildcard in the field.

The user may then select a site type from the available list. In this case, when a site has been selected for modification, the site type and location details may automatically be displayed. In one embodiment, if the user has not allocated any zones to the site, the site type may be changed. Similarly, if the user has not allocated any devices or the zones within the site or configured device relationships, the user may change the location details.

Figure 6C:
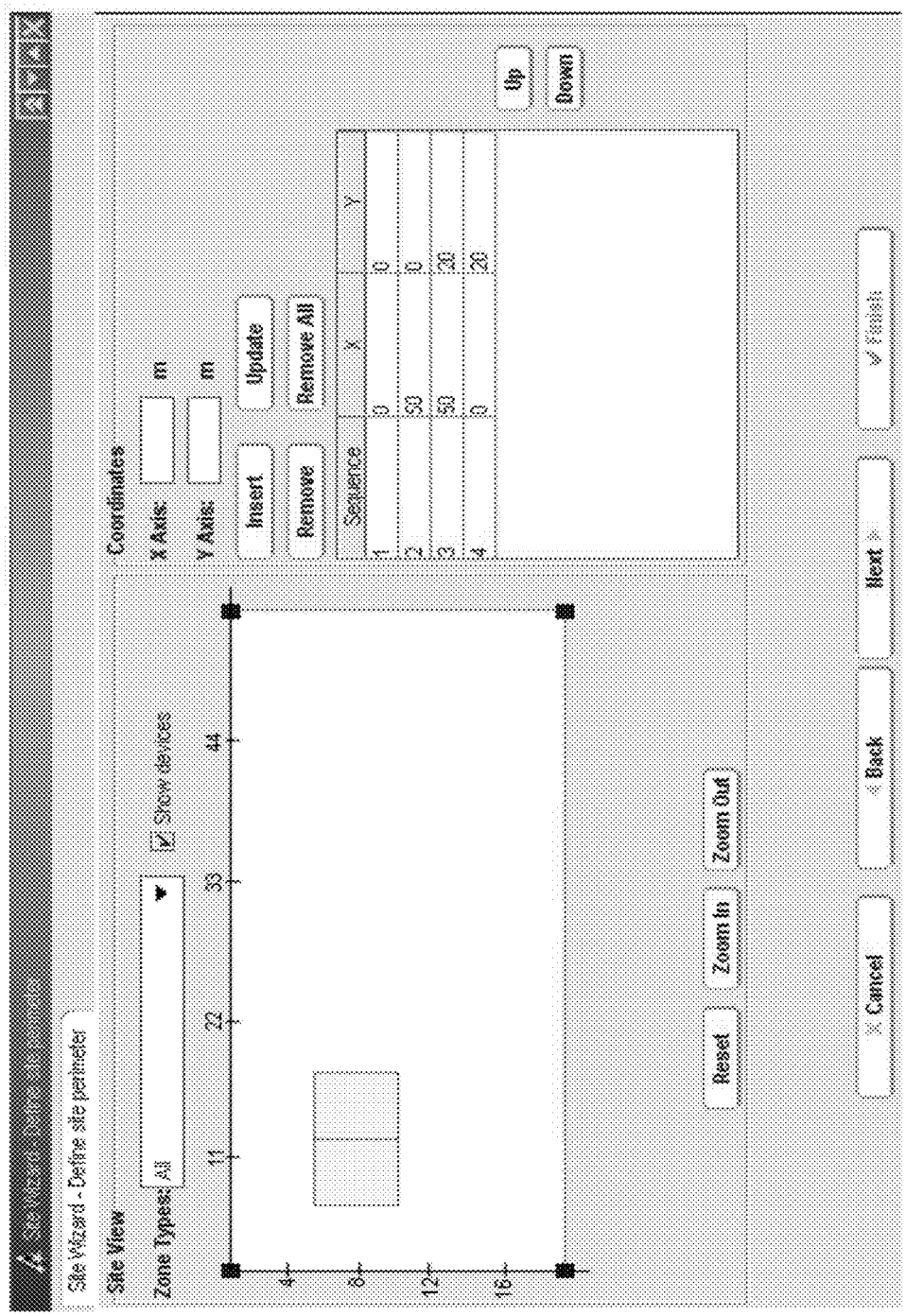

The user may then select a location. Once the user selects a location, the user may define the site perimeter. See operation 604 of FIG. 6A. In one embodiment, the user may select next on the type and location interface and an interface to define a site perimeter may be displayed. FIG. 6C shows an interface to define a site perimeter, in accordance with one embodiment.

In one embodiment, the interface to define a site perimeter may show a canvas representing the site perimeter. Using this interface, a user may choose the site view options to show any zones already allocated by type, with or without devices, on the canvas. Additionally, zones may be filled with a defined color, where a color defines a zone type.

As an option, some types of zones may be set as transparent so that underlying zones may be seen. As another option, the user interface may also be utilized to scale the canvas using zoom buttons (e.g. zoom in and zoom out buttons, etc.). Furthermore, a reset button may be provided to return the canvas to a default view.

The user interface may also be utilized to add coordinates to the perimeter of the site. In this case, a user may enter X axis and Y axis coordinates and click "Insert." As another option, the user may click on the canvas to select a point. The canvas may be updated with the new perimeter and the coordinates are added to and shown in a coordinates list.

As an option, the units of measurement displayed for the coordinates may be associated with the site type. Furthermore, if a coordinate pair is selected from the coordinate list, the position may be shown as a red square on the vertex. In one embodiment, a user may change the perimeter by entering additional X and Y values and then clicking "Insert," or selecting a coordinate pair from the coordinate list, changing its X and Y values, and clicking "Update."

As an option, the position of coordinate pairs in the coordinate list may be adjusted by selecting a coordinate pair and selecting "Up" and "Down." Coordinate pairs may be removed from the list using the "Remove" and "Remove All" buttons.

Figure 6D:
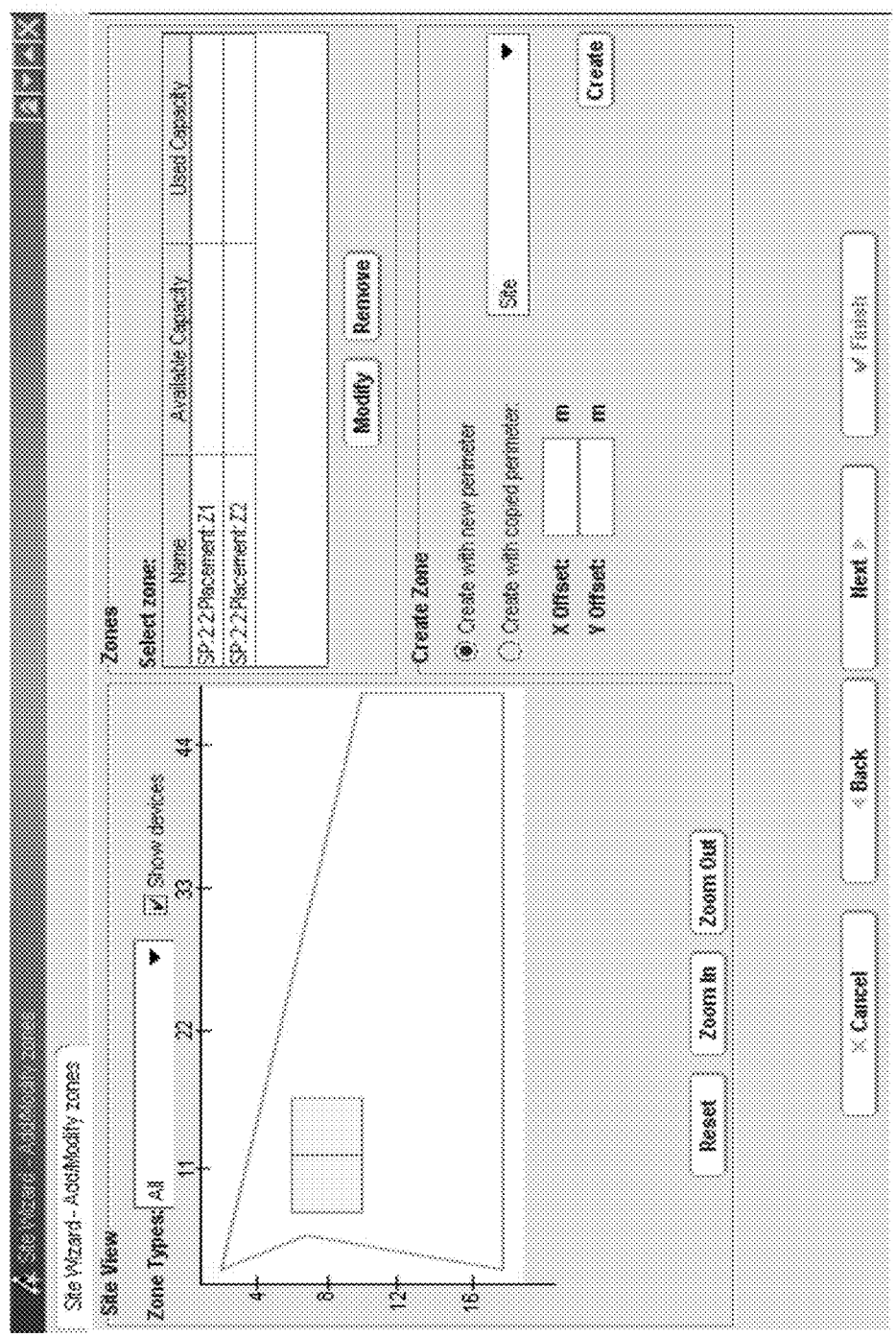

Once the user has defined a perimeter, the user may add or modify zones. See operation 606 of FIG. 6A. In one embodiment, by selecting "Next" on the interface to define a site perimeter, an interface to add or modify zones may be displayed. FIG. 6D shows an interface to add or modify zones, in accordance with one embodiment.

The interface to add or modify zones may show the view of the site on the canvas, including any zones already within the site. If present, a zone in the zone selection list may be selected to see how the zone is brought to the front of the canvas with its vertices highlighted. Using this interface, a user may create zones. Alternatively, a user may skip zone creation by selecting "Next."

To create a zone a user may define a perimeter for the zone. See operation 608 of FIG. 6A. In this case, the user may select to create a zone with a new perimeter. Additionally, the user may create a zone with a copied perimeter by selecting a zone from a list as the source, specifying the X offset and Y offset for the perimeter of the new zone and clicking "Create."

In one embodiment, the perimeter of the zone to be created may default to the same value as the zone selected from the list. In this case, this and other attributes may be changed. As an option, a zone may be created based on the perimeter of the site. In this case, the coordinates may not be able to be offset. Additionally, an existing zone may be modified by selecting it from a list of zones and clicking "Modify."

Figure 6E:
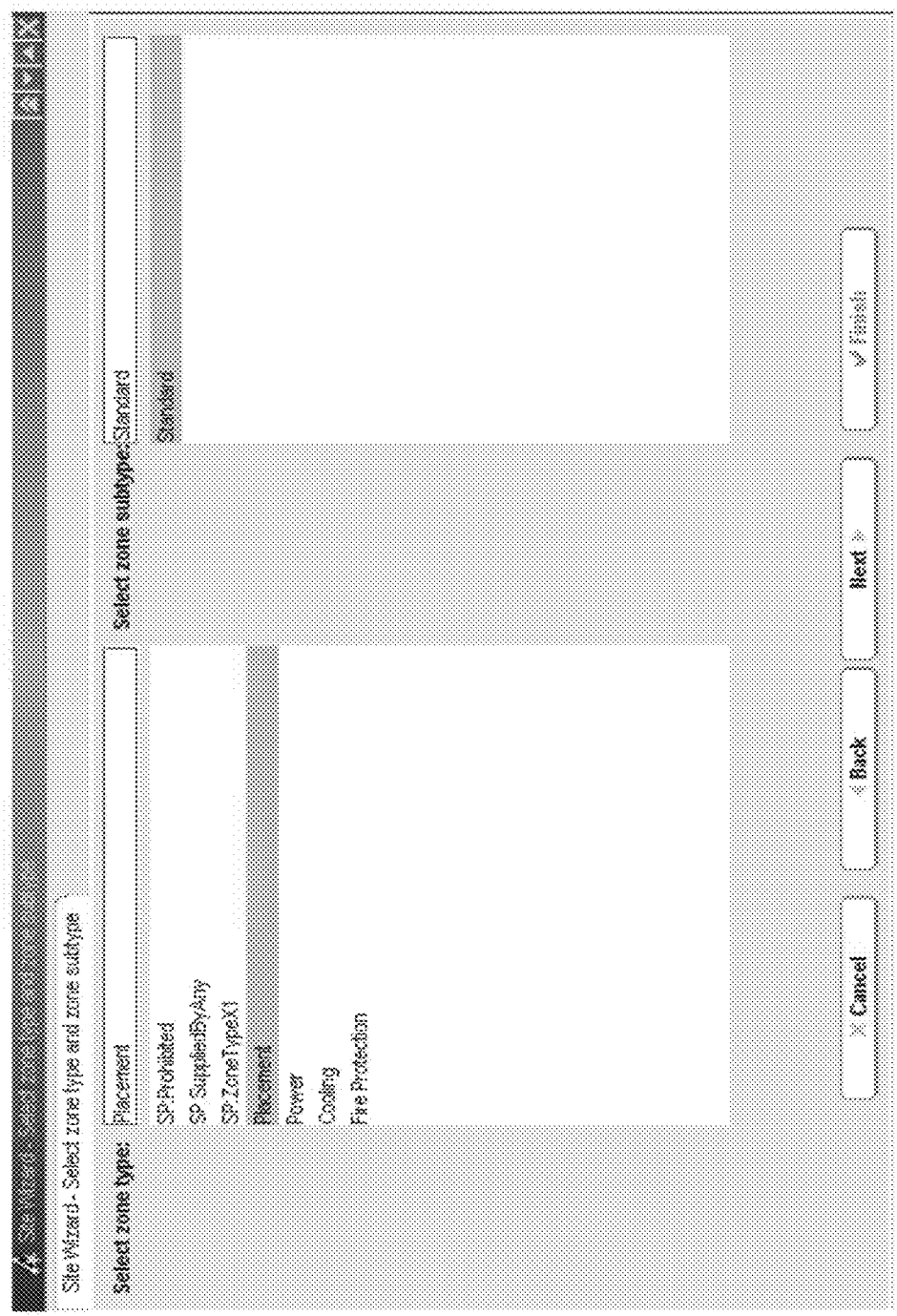

An interface for selecting a zone type and subtype may also be displayed. FIG. 6E shows an interface for selecting a zone type and subtype, in accordance with one embodiment.

The zone type and subtype selection interface may be utilized to define the zone type and subtype for the zone a user is creating. In one embodiment, if a zone is being modified and has device relationships specified, the zone type and subtype may not be modified.

Figure 6F:
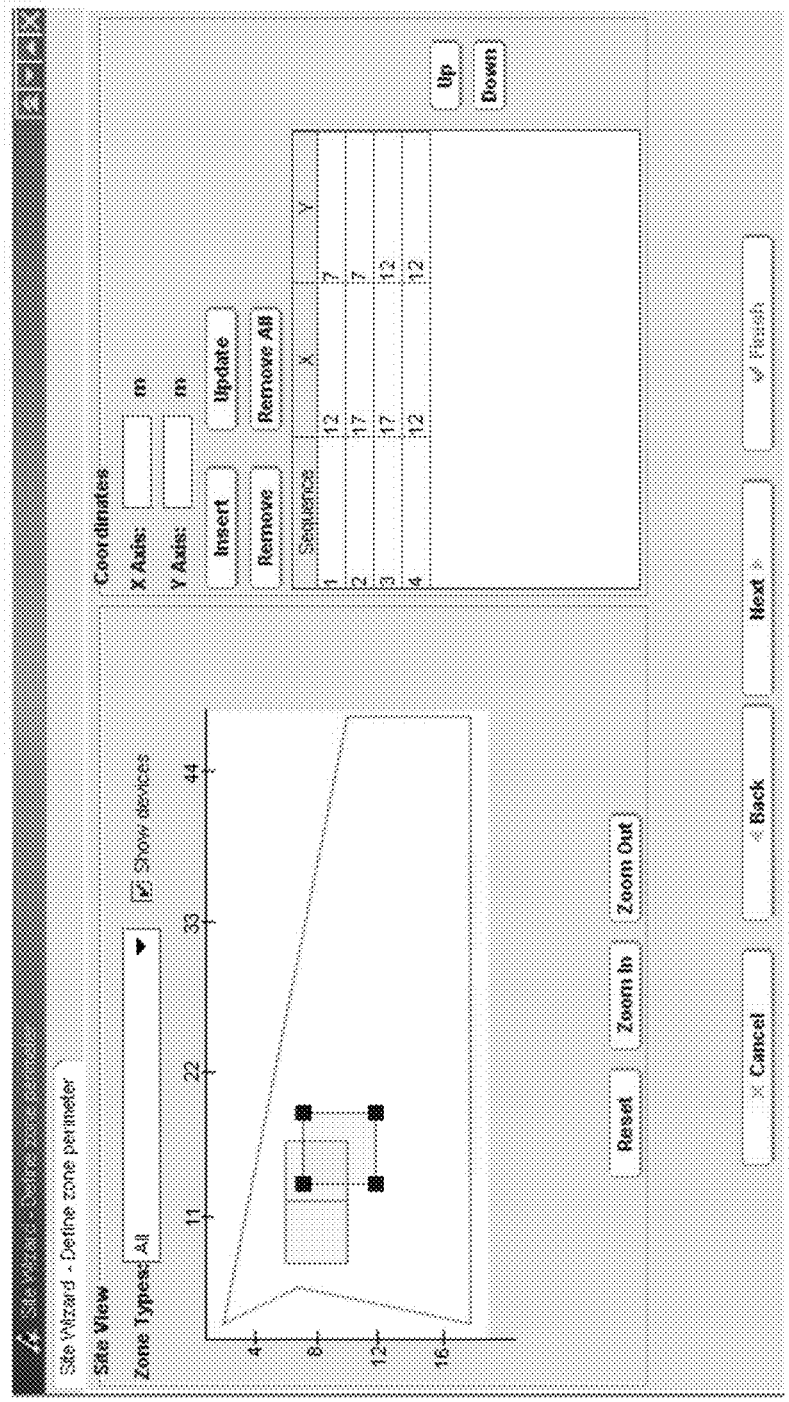

The zone type and subtype selection interface may be utilized to select a zone type from a zone type list. In one embodiment, valid zone subtypes may automatically be displayed. The relevant zone subtype may be selected from the list of subtypes. Once the zone type is selected, an interface for defining a zone perimeter may be displayed. FIG. 6F shows an interface for defining a zone perimeter, in accordance with one embodiment.

The interface for defining a zone perimeter may be utilized to create a perimeter for the zone a user is creating. Using this interface, a user may enter X axis and Y axis coordinates for the new zone in the same way the site perimeter is defined. As another option, the user may click on the canvas to select a point. In one embodiment, the zone being edited may be displayed at the front of the canvas view.

As an option, the units of measurement that are displayed may be associated with the zone type. If the zone type is capacity managed, the supply and/or supplier devices and other planned resources may be specified. See operation 610 of FIG. 6A.

Figure 6G:
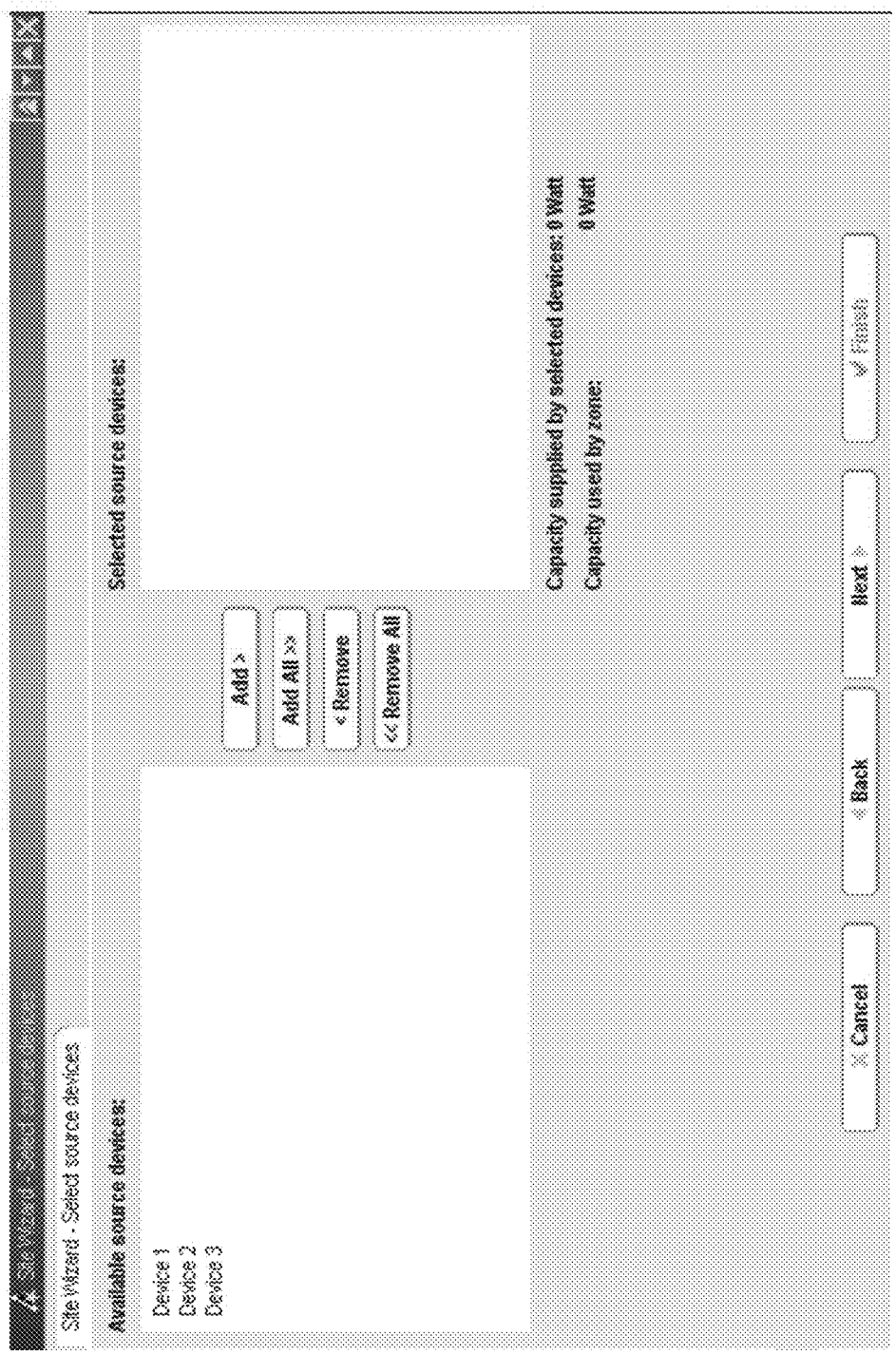

In one embodiment, an interface to select source devices may be launched from the interface for defining a zone perimeter. FIG. 6G shows an interface for selecting source devices, in accordance with one embodiment.

In one embodiment, the interface for selecting source devices may only be shown when the zone type is capacity managed. In this case, source devices may be placed in the zone by selecting them from an available source devices list and clicking "Add" or "Add all." As an option, the list may only display devices allowed by the zone type within the location of the site.

Additionally, chosen devices may be displayed in a selected source devices list. In this case, devices may be removed from the selected source devices list by selecting them from the list by clicking "Remove." As an option, to remove all the devices, a user may click "Remove All."

Figure 6H:
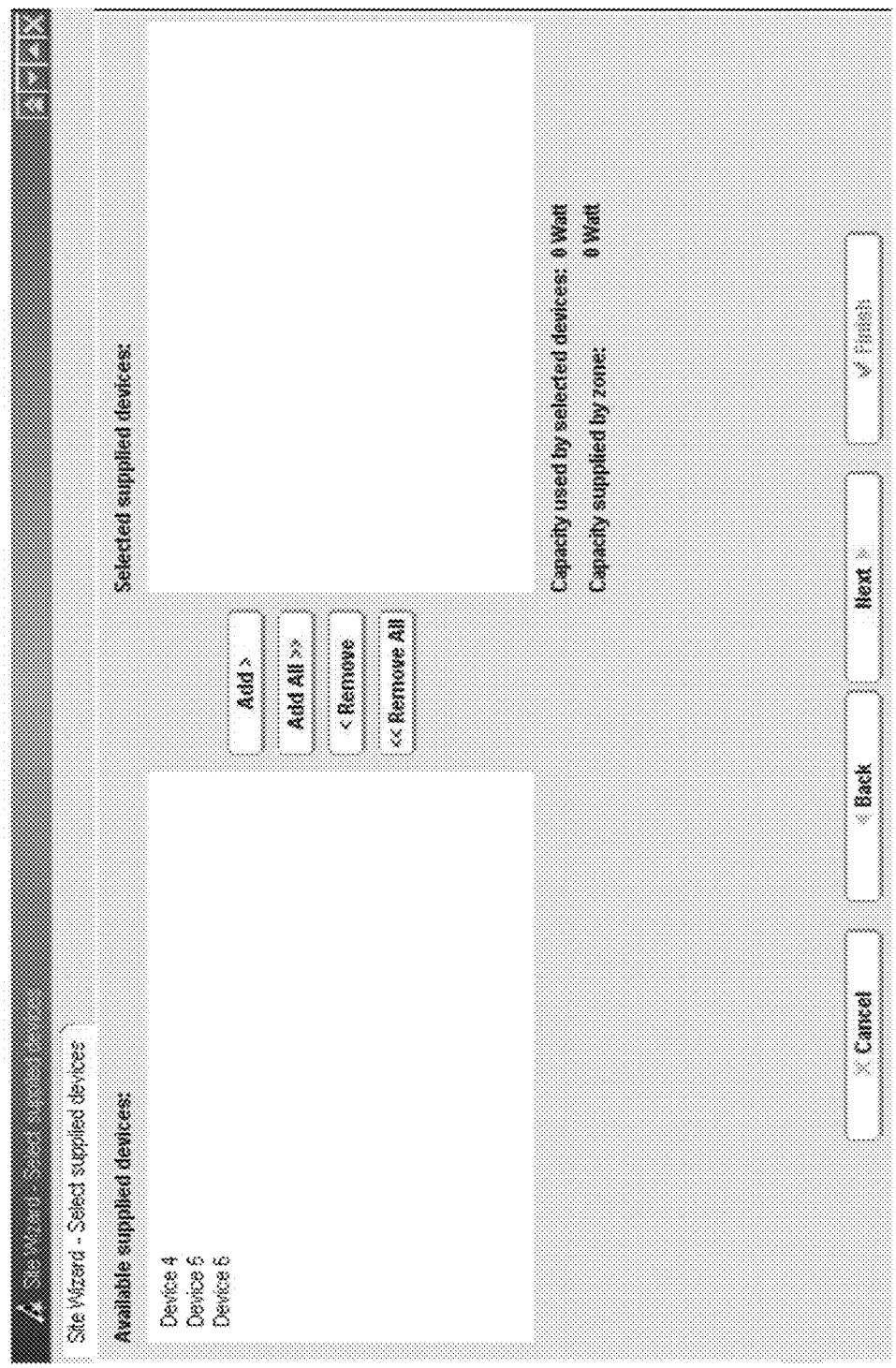

When devices are added or removed from the selected supplier devices list, a capacity used by selected devices value and a capacity supplied by zone value may be automatically recalculated and displayed under the list. The user may then select supplied devices. For example, the user may click "Next" on the interface for selecting source devices and an interface to select supplied devices may be displayed. FIG. 6H shows an interface for selecting supplied devices, in accordance with one embodiment.

In one embodiment, the interface for selecting supplied devices may only be shown when the zone type is capacity managed. Using this interface, the user may place supplied devices in the zone by selecting them from an available devices to supply list and clicking "Add" or "Add all." In one embodiment, the list may display only devices allowed by the zone type that fall within the perimeter of the zone.

As an option, only racks and container devices may be shown. In this case, devices inside rack shelves or container nodes may not be listed. Chosen devices may be displayed in a selected devices to supply list. In one embodiment, the lists may only be editable when the zone has an explicit behavior.

In this case, when the zone has implicit behavior, all available lists may automatically be selected. As an option, the user may remove devices from the selected supplier devices list by selecting them from the list and clicking "Remove." To remove all the devices the user may click "Remove All."

When devices are added or removed from the selected supplier devices list, a capacity used by selected devices value and a capacity supplied by zone value may automatically be recalculated and displayed under the list. Once the supply and/or supplier devices are specified, zone attributes may be defined. See operation 612 of FIG. 6A.

In one embodiment, the user may click "Next" on the interface for selecting supplied devices and an interface for defining zone attributes may be displayed. FIG. 6I shows an interface for defining zone attributes, in accordance with one embodiment.

In one embodiment, the interface for defining zone attributes may include an automatically generated aggregate zone name, which may be changed. Using this interface, zone attribute values may be added from the displayed list. Once complete, the user may click "Next" to return to the interface to add/modify zones, where more zones may be added if desired.

Figure 6J:
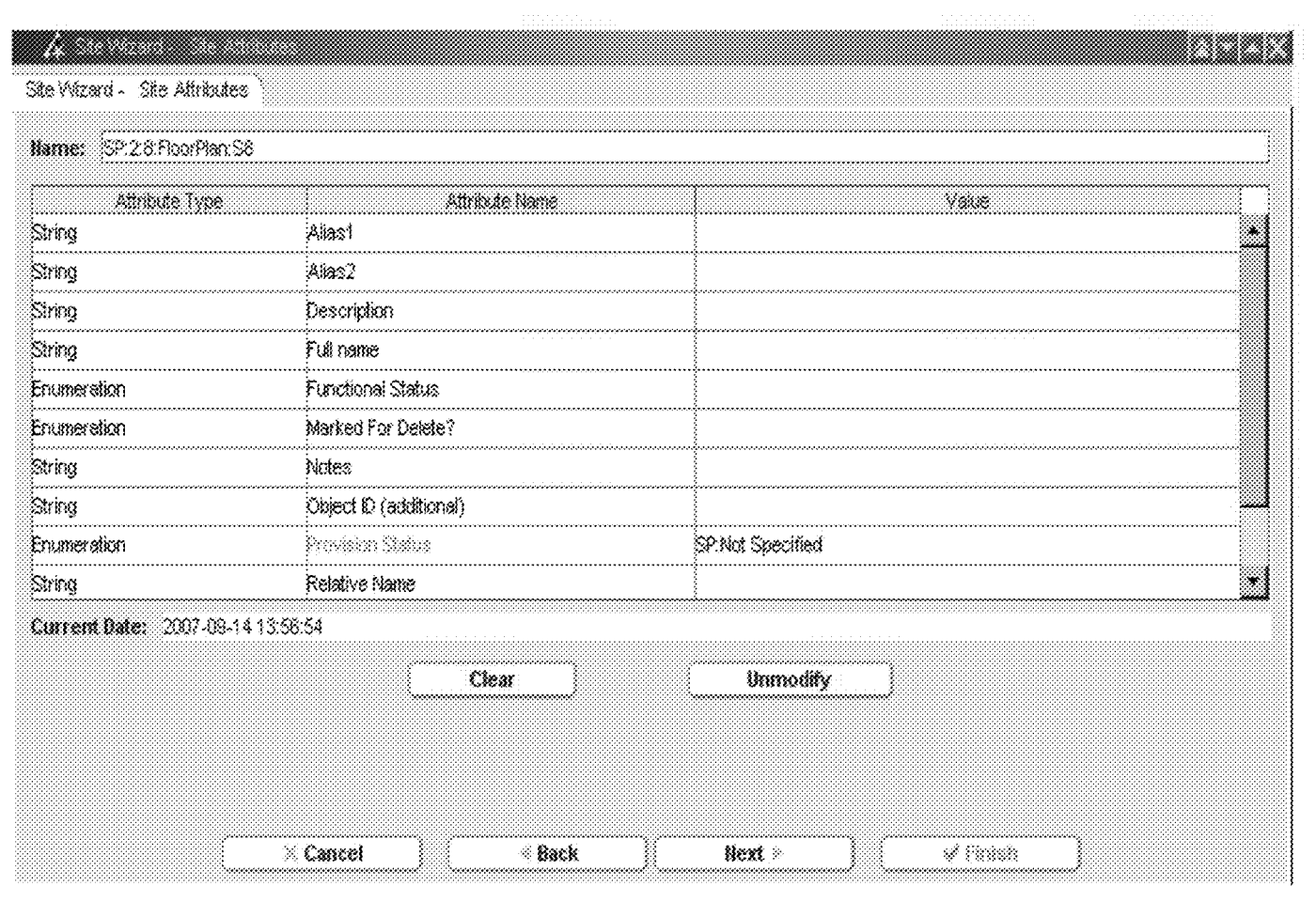

Once the zones have been added or modified, site attributes may be defined. See operation 614 of FIG. 6A. In one embodiment, an interface for defining site attributes may be launched from the interface to add/modify zones. FIG. 6J shows an interface for defining site attributes, in accordance with one embodiment.

In one embodiment, the interface may include an automatically generated aggregate site name that may be changed if desired. Using this interface, site attribute values may be added from a displayed list. Once the site attributes are defined, the definitions and specifications may be summarized and/or confirmed. See operation 616 of FIG. 6A.

Figure 6K:
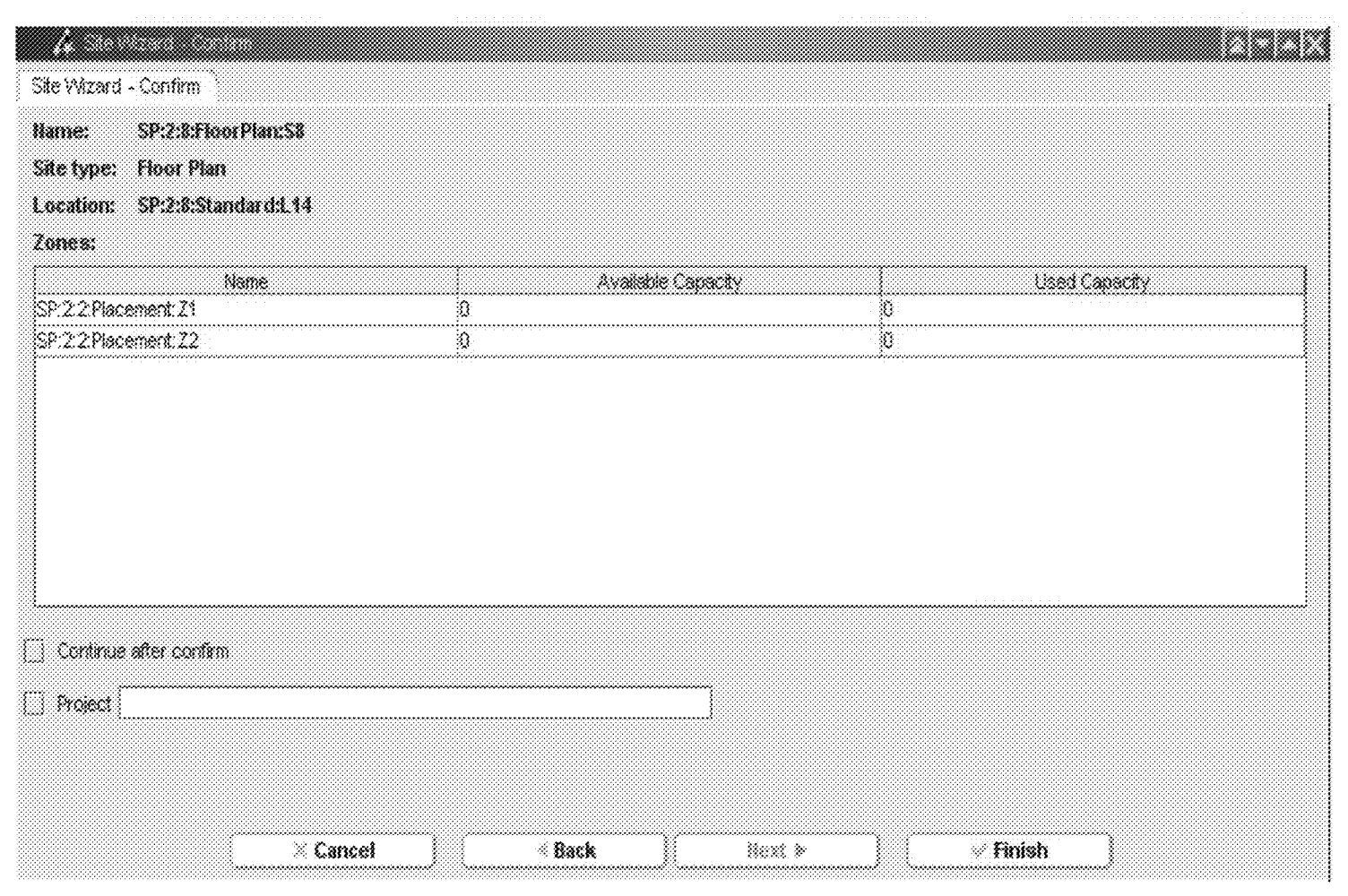

In this case, an interface showing a summary and allowing for confirmation may be displayed. FIG. 6K shows an interface for confirmation, in accordance with one embodiment. Using this interface, the user may select a continue after confirm check box to use the reuse the site designer and associated interface more than once.

Having created a site to represent a room or building, devices within the site may be represented. In one embodiment, devices may be placed in a site when the site is created using the user interface for creating sites (e.g. the site wizard, etc.) or using a user interface such as a device placement wizard.

Devices may also be placed in zones within a site, where the capacity for the type of zone may be managed. In this case, when a device is allocated to a site, it may be defined as a consumer or contributor to its capacity. For example, a source device may contribute to the capacity of a zone.

Additionally, a supplied device may consume the capacity of a zone. An unsupplied device may describe an explicit device placed within a zone where no association has been made. In one embodiment, relationships may be made to devices within the same location, but not within the site. For example, a device external to a site may contribute to the power supplied by its power zone.

As an option, a user interface such as the device placement wizard may be utilized to allocate devices to a chosen site. In this case, devices may be provided within the device placement wizard for selection. These devices may be derived from the location in which the site is situated.

In various embodiments, devices may be positioned on a canvas of a site or within a rack. When positioning a device within a site, the device should satisfy the physical constraints of the site. In one embodiment, each device may be assigned a position using X and Y coordinates and a rotation relative to the site position. As another option, the user may click on the canvas to select a point.

In some cases, devices should be placed completely within a site perimeter and should conform to any zone-based restrictions. The position and rotation of devices within a site may be graphically depicted on the user interface. Additionally, the capacity usage or contribution provided by a device may be calculated using values configured against the device type.

In various embodiments, the values may include various values. For example, in one embodiment, the values may include device values such as external width, height, and length dimensions that may be used when allocating a device to a site canvas or rack. The device may also have a value that represents its power or cooling capacity for capacity management.

In another embodiment, the values may include rack or cabinet values such as the external width, height, and length dimensions that may be used when allocating a rack, to a site canvas. In this case, a rack, as a holding device, may not have any capacity management values.

Although a device may be placed directly in a site, without being positioned within a zone, in one embodiment, some zone types may require devices, as defined by their legitimacy setting. As an option, a resolution status may indicate whether further site planning is required to properly represent the requirements of a space. In this case, the resolution status may be shown on the user interface when placing devices using the device placement wizard and also on browsers, where an icon against a site may represent statuses such as resolved, unresolved/unallocated devices, unresolved/devices placed in exclusion zones, and unresolved/devices not in obligatory zones. Thus, the device placement user interface may be used to allocate and arrange devices for site planning by allocating devices to sites and arranging them within their zones, and creating relationships between devices and zones.

FIGS. 7A-7F show a method 700 and user interfaces for placing resources, in accordance with one embodiment. As an option, the method 700 may be implemented in the context of the details of FIGS. 1-6K. Of course, however, the method 700 may be carried out' in any desired environment. Once again, the aforementioned definitions may equally apply to the description below.

Figure 7A:
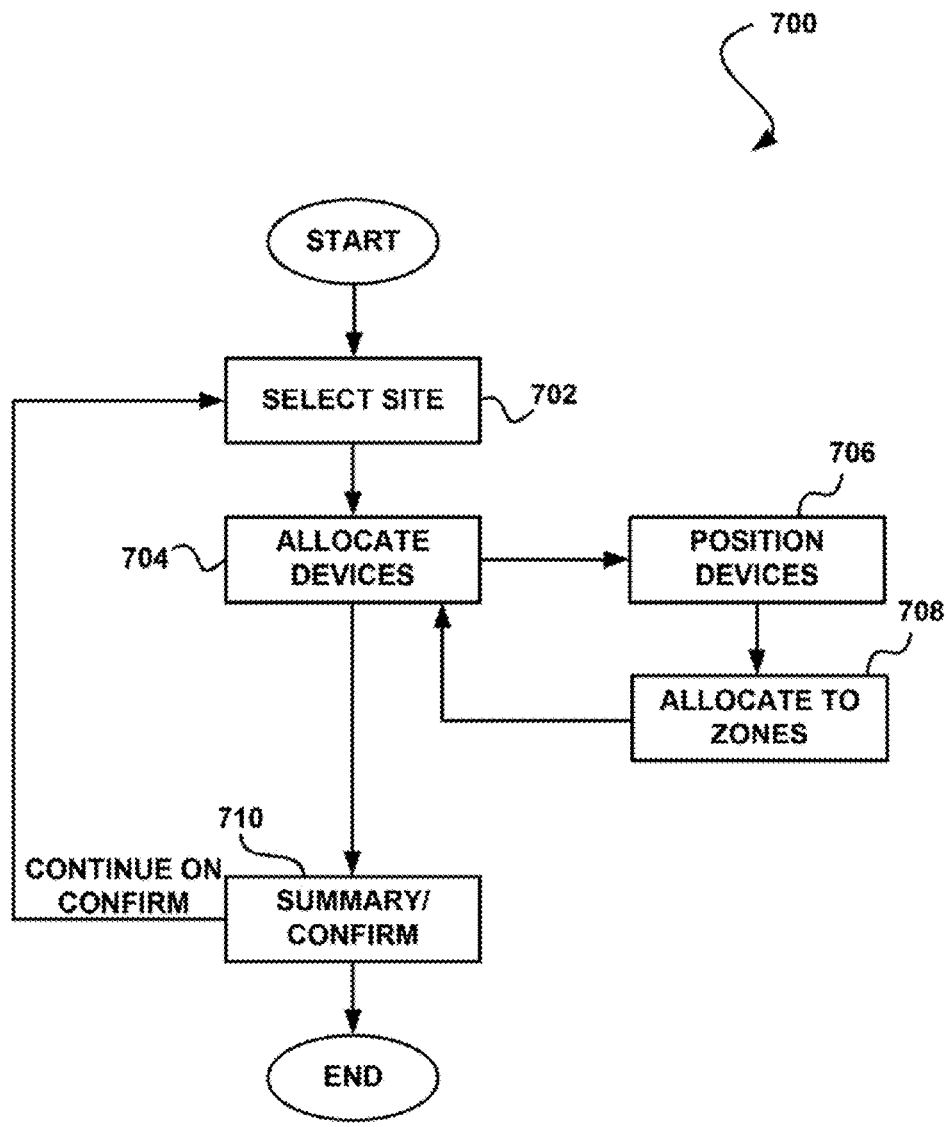
Figure 7B:
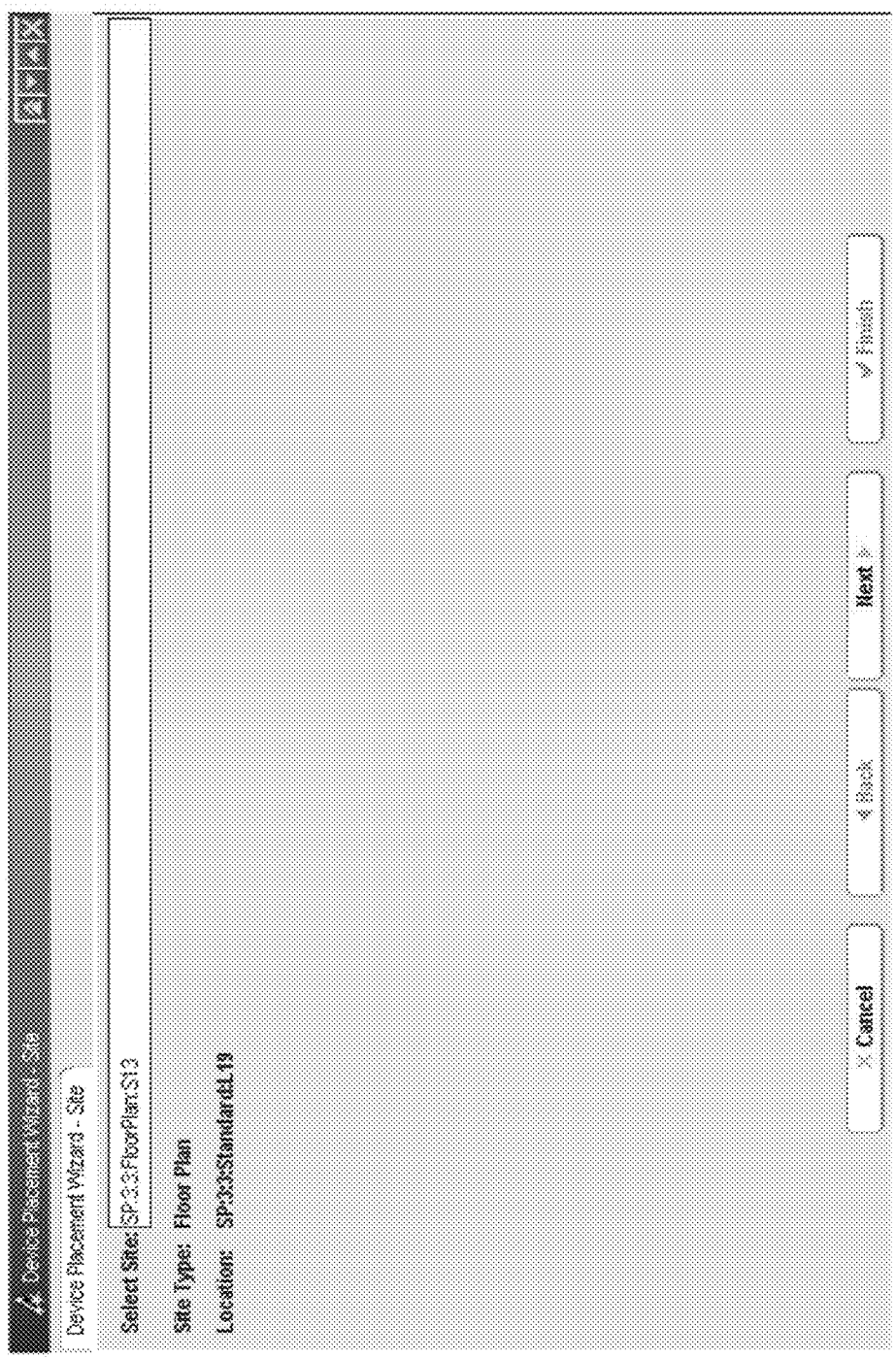

As shown, a user may select a site to place devices. See operation 702 of FIG. 7A. In one embodiment, the user may select this site utilizing a site selection interface associated with an interface for device placement. FIG. 7B shows a site selection interface, in accordance with one embodiment.

Using this interface, a user may enter the name of the site directly or select it from the user interface. As an option, the user may also search for a site using find options. After a site is selected, a type and location of the site is displayed.

Figure 7C:
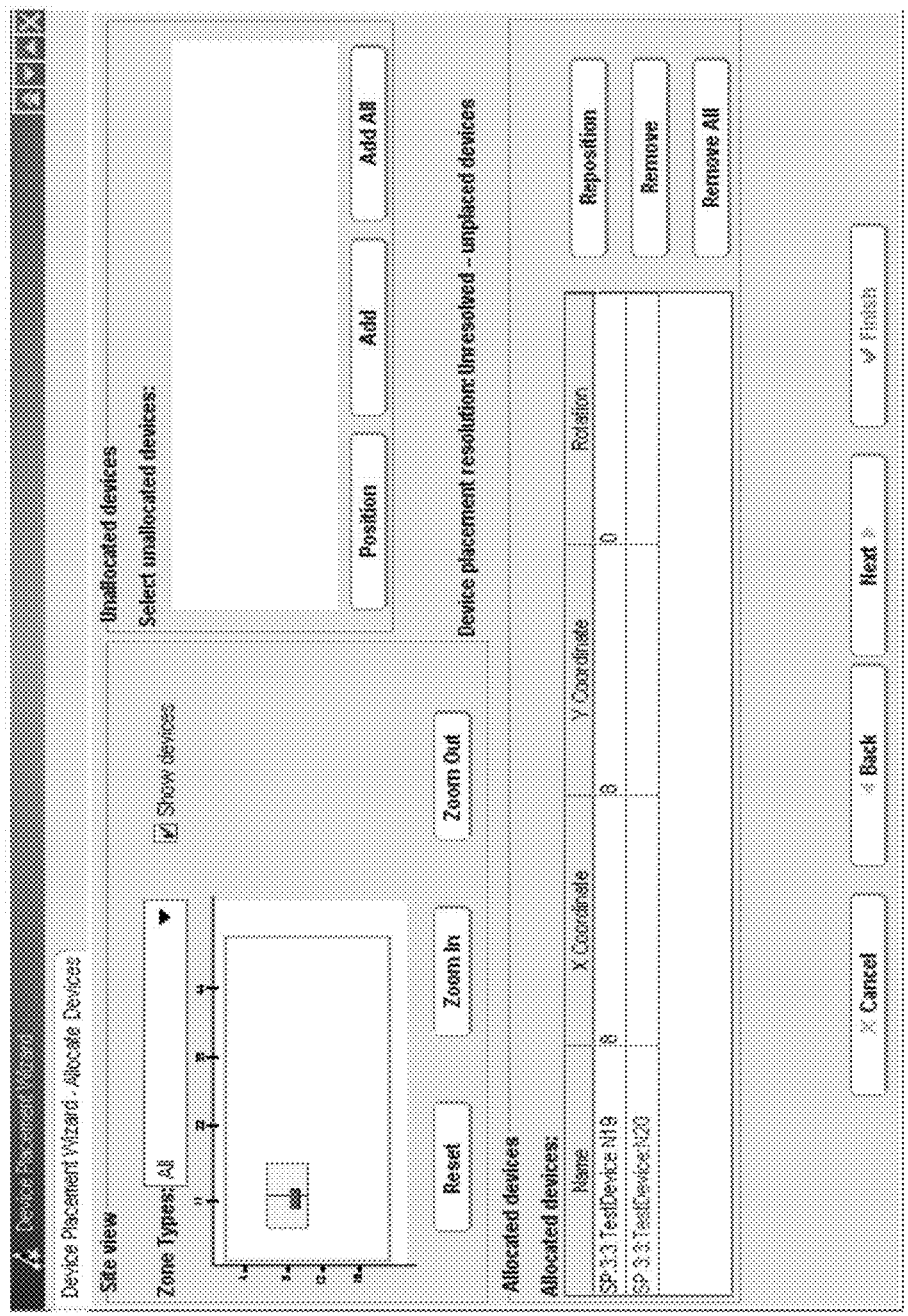

Once the site is selected, devices may be allocated. See operation 704 of FIG. 7A. In one embodiment, the user may click "Next" on the site selection interface and an interface for allocating devices may be displayed. FIG. 7C shows an interface for allocating devices, in accordance with one embodiment.

In one embodiment, the interface for allocating devices may include a canvas showing the site perimeter, zones within the site, and any devices that may have been placed within the site. In this case, when selected, an allocated device may be brought to the front of the view and highlighted.

Using this interface, devices may be allocated within the site with or without positioning. To add a device with positioning, the device may be selected from the unallocated list and a "Position" button may be clicked. As an option, a user may also change the position of an allocated device by selecting it and clicking "Reposition."

To add a device without positioning, a device may be selected from a select unallocated devices list and an "Add" button may be clicked. The device may be removed from the list and added to an allocated devices list. In this case, no rotation or coordinates may be set.

Figure 7D:
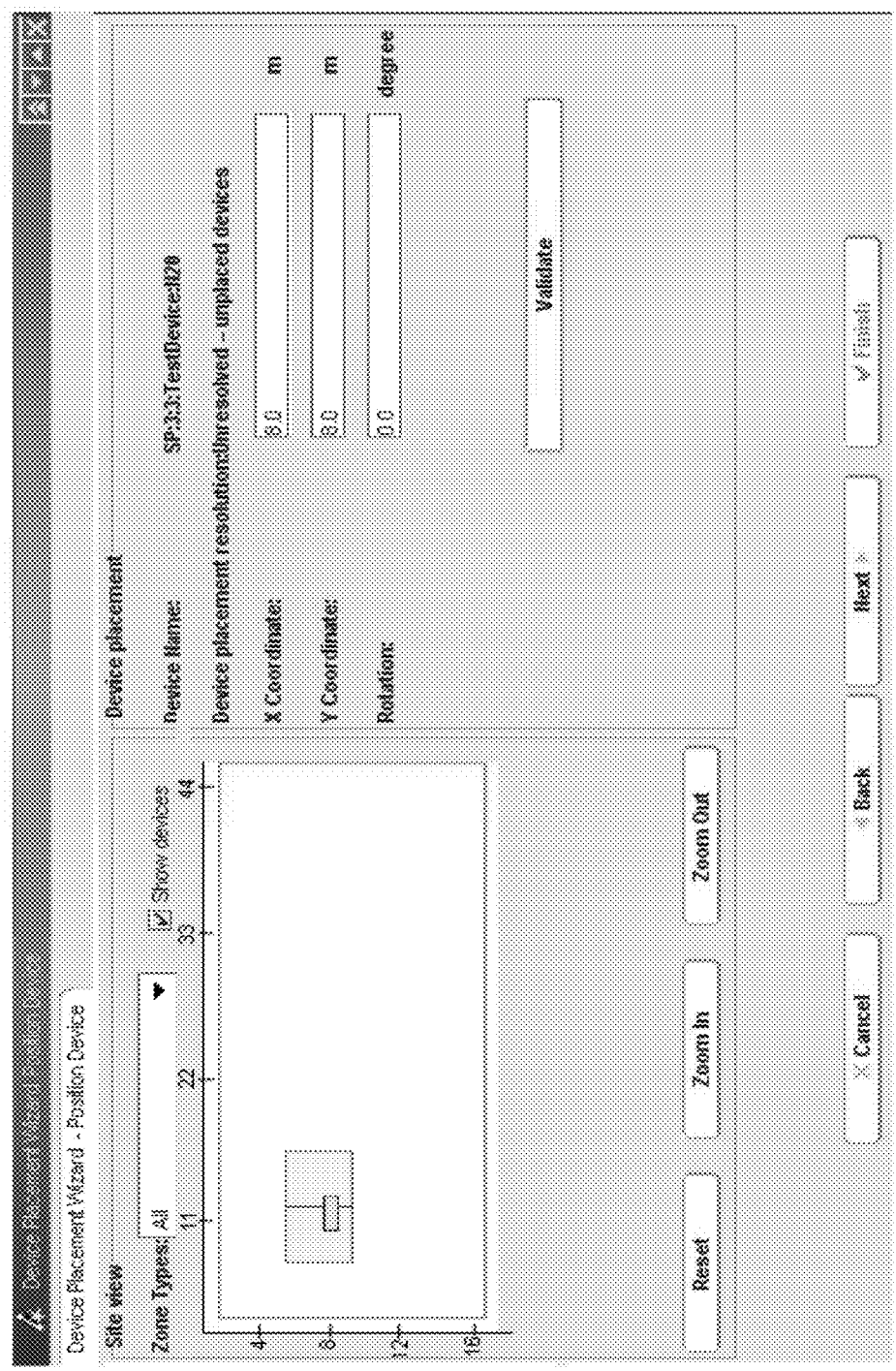

When the user has allocated the devices, the devices may be positioned. See operation 706 of FIG. 7A. In one embodiment, an interface for positioning devices may be displayed to the user. FIG. 7D shows an interface for positioning devices, in accordance with one embodiment.

The interface for positioning devices may be used to position devices specified on the interface for allocating devices page. As an option, the device being positioned may be brought to the front of the view and highlighted. To position a device, a user may enter X axis and Y axis coordinates, the angle of rotation, and then click "Insert."

In one embodiment, the units of measurement displayed may be associated with the site type. The position of the device may then be validated by clicking the "Validate" button. In one embodiment, this may validate the placement against the limits of the site perimeter, obligatory or prohibited zones in the site, overlap of zone boundaries whose zone type prohibits device overlap, and the maximum capacity of a chosen zone to determine whether it is over allocated. As an option, a warning or error message may indicate any possible reason for unsuitability.

Figure 7E:
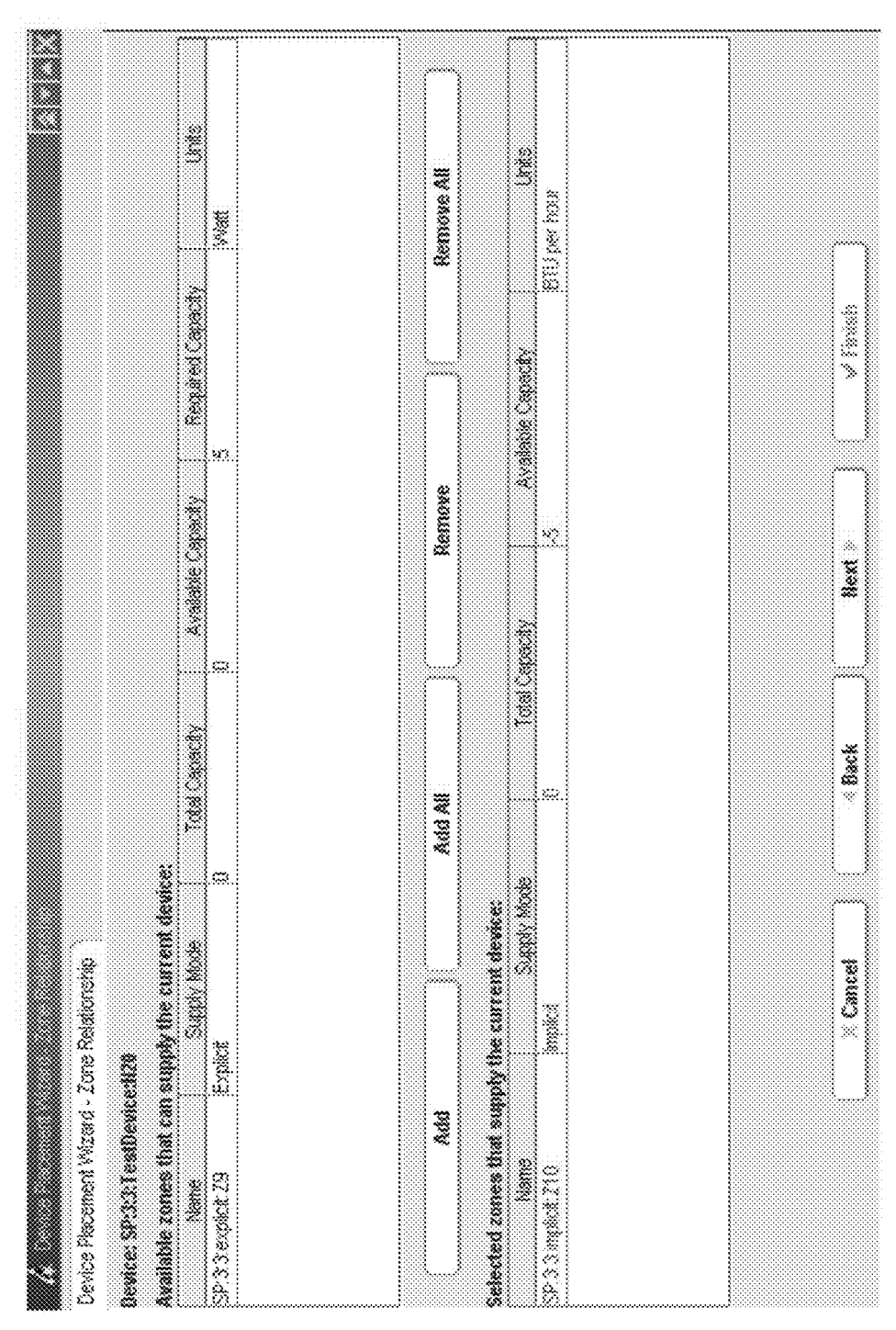

The user may then allocate the devices to zones. See operation 708 of FIG. 7A. In one embodiment, the user may accomplish this using a zone relationship interface. FIG. 7E shows a zone relationship interface, in accordance with one embodiment.

Using the zone relationship interface, a user may define relationships between supplied devices and zones. In one embodiment, a list of zones that can supply capacity to the device may be displayed. As an option, those defined with a supply mode of implicit may automatically be added to the selected list and may not be removed.

As another option, each list may show the capacity currently provided and available for each zone. Additionally, a list of available zones that can supply the current device may show the capacity required by the current device for that zone if it is set as a supplied device. Further, any zone in a list of selected zones that supply the current device list that is over allocated may be highlighted (e.g. in red, etc.).

As an option, a zone may be added by selecting it from the list of available zones that can supply the current device and clicking "Add." Additionally, all zones may be added by clicking "Add All." When a zone is added, the zone may be removed from the available list and may appear in the selected list.

As an option, a zone may be removed from the list of selected zones that supply the current device by selecting it and clicking "Remove." Additionally, devices included inside racks or container devices may not be set as being supplied by a zone. In this case, the relationship may be defined on the top-level device. However, the contained devices may be included in capacity calculations.

Once complete, a user may return to the interface for allocating devices and may allocate and position further devices, if desired. Once all of the devices are allocated, the device placement information may be summarized and/or confirmed. See operation 710 of FIG. 7A.

Figure 7F:
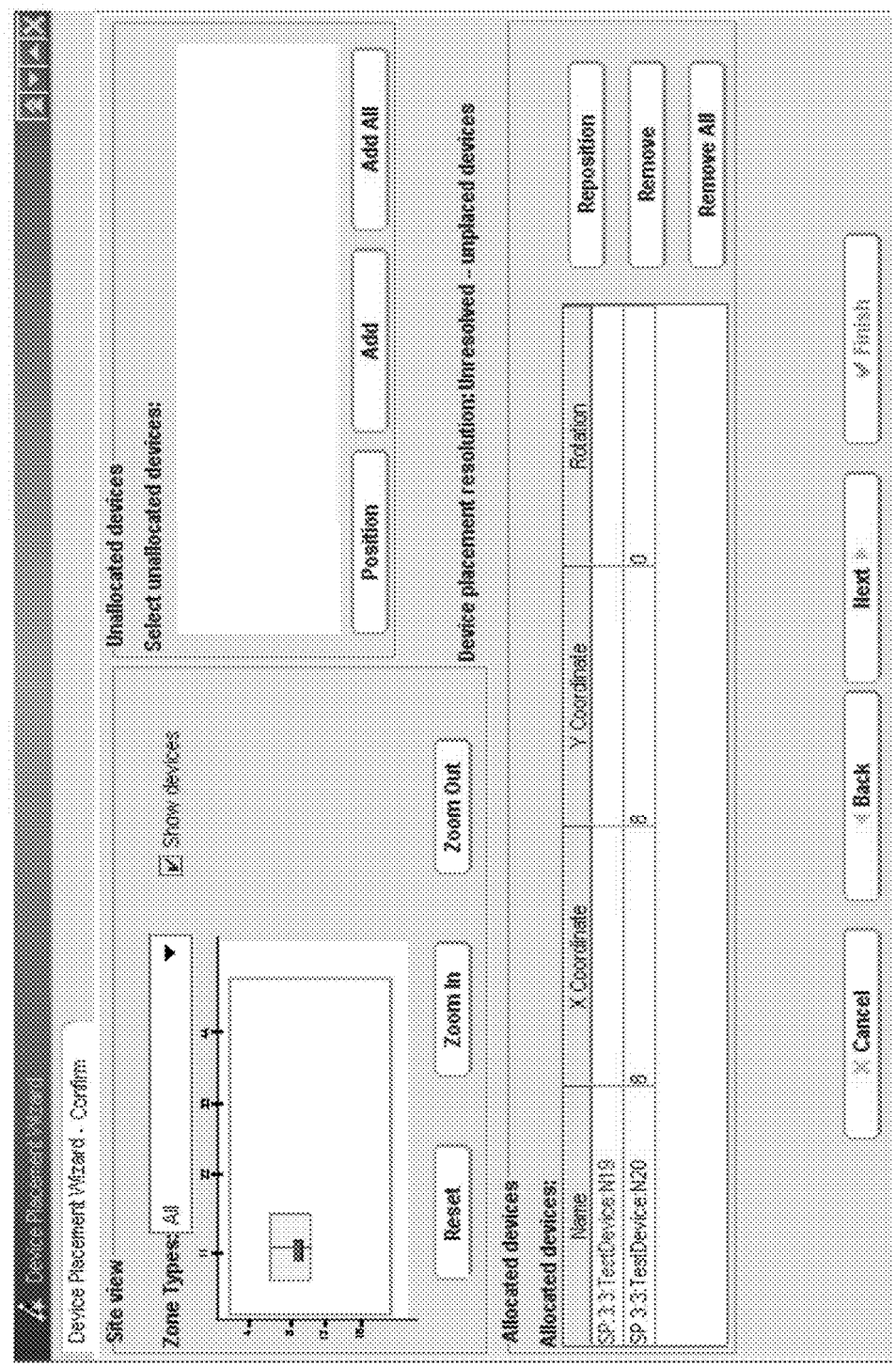

In one embodiment, this information may be summarized and confirmed using a device placement confirmation interface. FIG. 7F shows an interface for summarizing and confirming a device placement, in accordance with one embodiment.

In one embodiment, the device placement confirmation interface may show a summary of the site and the devices allocated to that site. In various embodiments, this may be accomplished by detailing the name and parent location of the site, the resolution status of the new device placement, and a list of the devices allocated to the site along with any positional information.

In one embodiment, the device wizard may ensure that, when a device is created or modified, a selected container is at the same site as a device. Additionally, the device wizard may ensure that if the device is explicitly supplied by a zone within a site, a container cannot be selected. Further, the device wizard may ensure that if the device is being added to a container in a site, it may affect the capacity of a zone within the site.

In another embodiment, a rack wizard may be utilized. In this case, the rack wizard may have the same controls as the device wizard, with the rack being the container. As an option, a device that is explicitly supplied by a zone within a site cannot be added to a rack. Additionally, when adding a slot shelf to a rack shelf, the same validations may be applied to the device to which the slot shelf belongs. In this way, a schematic view of a room or rack may be generated such that a user may place resources on floors, walls, and shelves, etc.

Figure 8:
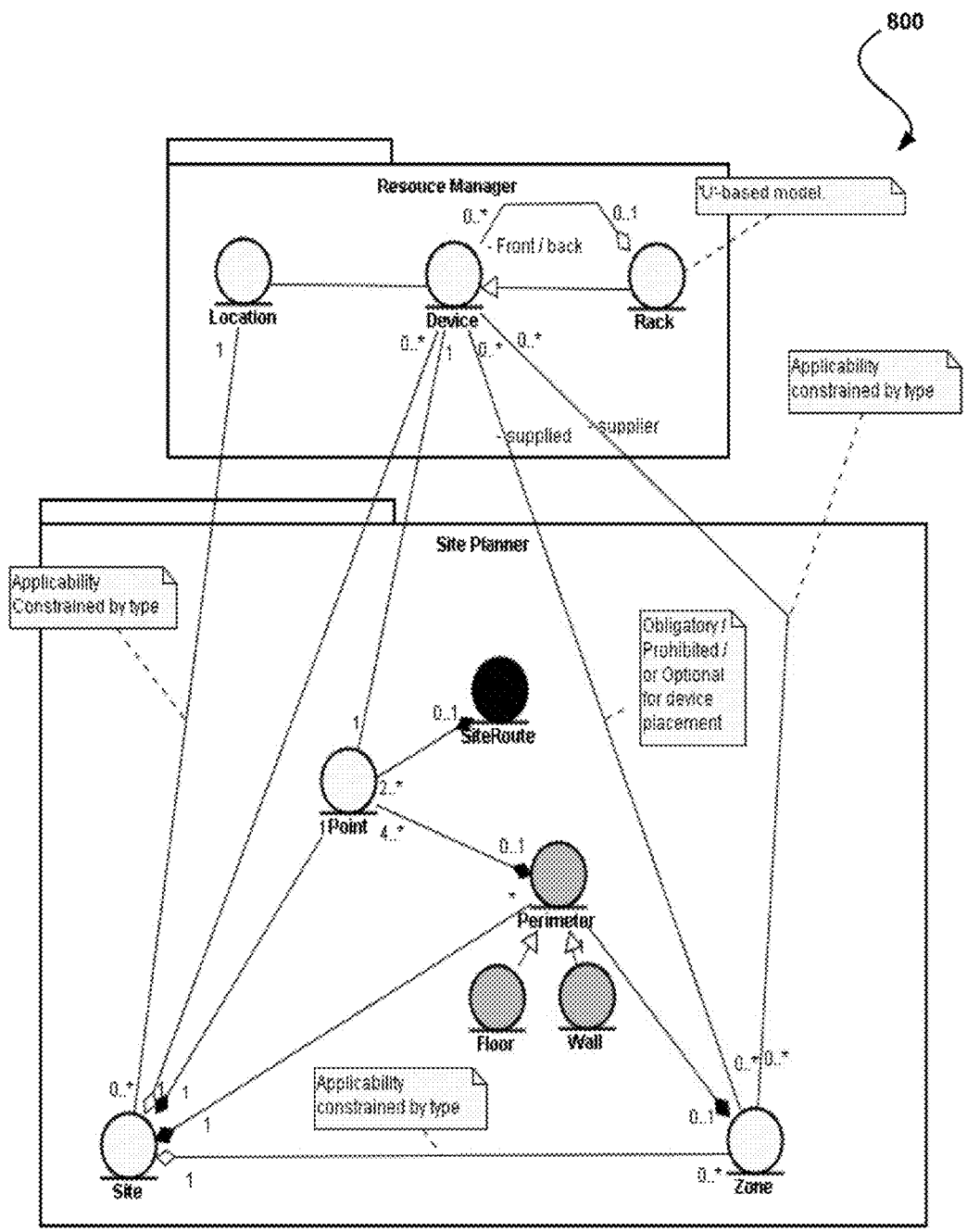
FIG. 8 shows a class diagram including a site planner and a resource manager, in accordance with one embodiment.

FIG. 8 shows a class diagram 800 including a site planner and a resource manager, in accordance with one embodiment. As an option, the class diagram 800 may be viewed in the context of the details of FIGS. 1-7F. Of course, however, the class diagram 800 may be viewed in the context of any desired environment. Further, the aforementioned definitions may equally apply to the description below.

As shown, the class diagram 800 illustrates the capability of including multiple perimeters in a site. In this case, the perimeters may include floor perimeters and wall perimeters. Thus, devices may be positioned by a user on a wall located in a site, or a floor located in the site.

Figure 9:
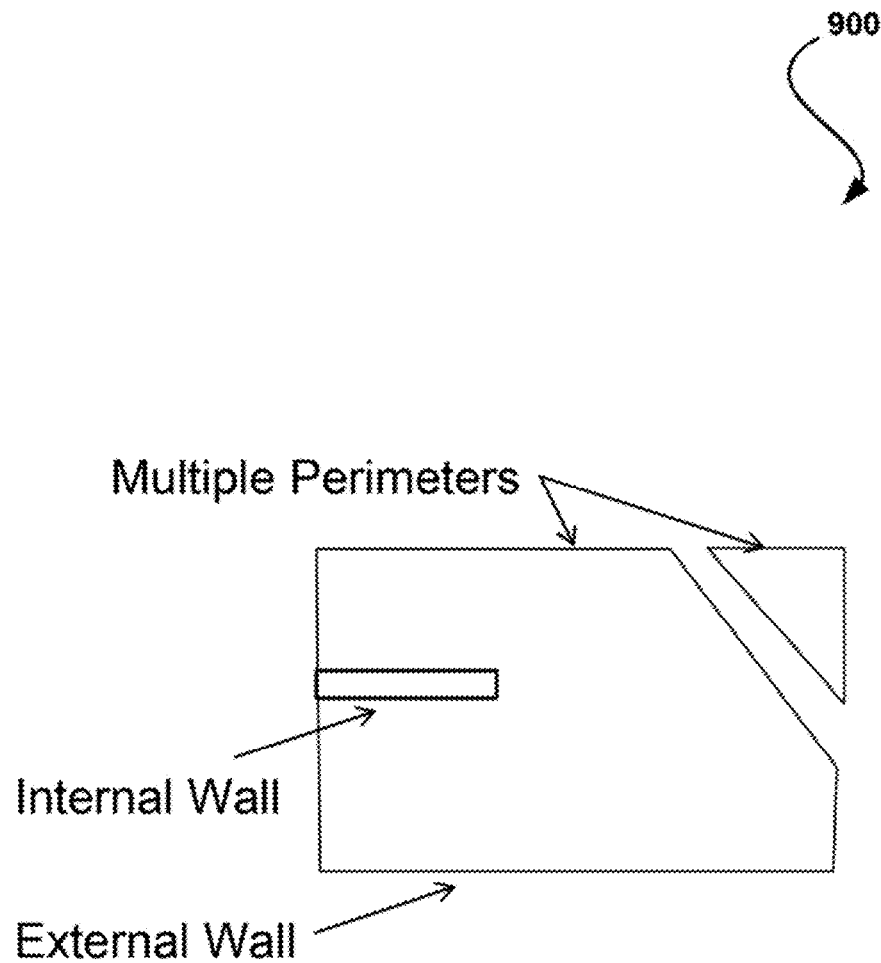
FIG. 9 shows a view including multiple wall perimeters, in accordance with one embodiment.

FIG. 9 shows a view 900 including multiple wall perimeters, in accordance with one embodiment. As an option, the view 900 may be implemented in the context of the details of FIGS. 1-8. Of course, however, the view 900 may be implemented in the context of any desired environment. Again, the aforementioned definitions may equally apply to the description below.

As shown, the view 900 may include multiple perimeters. In this case, walls may be modeled as extra usable areas on a design canvas. Devices may be placed on the walls in the same manner as being placed on the floors. Furthermore, the walls may be controlled in the same manner as the floors. Thus, a user may configure a site with walls and floors and place devices in the site as desired.

It should be noted that, in one embodiment, sites and/or device designs and attributes may be imported and/or exported to and from the user interface for generating the areas/sites and the devices. For example, generic import capability may be supported such that site information in a file including site perimeters and zones may be imported to the user interface such that a user may modify and/or save the file.

Thus, a file may be selected, the file format may be transformed to a standard format if needed, and the file may be imported. In this way, Computer Aided Design (CAD) files, bitmaps, and/or various other file formats may be transformed and imported. Similarly, the user may export created files by transforming the format of the created file to a desired format and exporting.

The user interface may also have the capability to display bitmaps (e.g. as a background, etc.), Visio, and AutoCAD files. Thus, these types of files may be generated by an external program and opened using the user interface.

Furthermore, in one embodiment, the site generation user interface and/or the device wizard may be configured to relay web-based reports. For example, a user may be permitted to run reports on sites and zones. In this case, when this functionality is invoked from a device, the zones that the device supplies may be searched for affected services. In one embodiment, these reports may include consumption of location, sites, racks, and devices.

Using the systems and methods described above, capacity management as well as planning may be implemented. In this way, a user may visualize what is in an area, as well as planning how to change it. Furthermore, the systems and methods described above may allow support for service assurance through the navigation of object relationships (e.g. a power zone to device to circuit to service, etc.), or through other relationships.

Using these techniques may lead to reduced rework in a planned network, as the site-based constraints are considered at the time of planning. Additionally, an active inventory may be utilized. In this way, the data may be managed through planning it in the system, and that may be used to drive implementation. Furthermore, as opposed to a database of record that is passive and updated after the fact, an active inventory keeps its data quality high by managing the data rather than simply recording it.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying one or more planned resources to be located in an area, the area having a plurality of characteristics including a plurality of zones, where:
each of the plurality of zones has an enclosed perimeter represented by a single polygon within the area identifying a portion of the area into which a plurality of planned resources are to be placed, the planned resources including each of one or more racks, cabinets, desks, power supplies, and servers, and
each of the plurality of zones has:
settings defining planned resources that must be placed within the zone, planned resources that cannot be placed within the zone, and planned resources that may optionally be placed within the zone,
settings defining one or more functions supplied to planned resources in the zone, and
settings defining whether a resource overlapping the enclosed perimeter of the zone is prohibited by the zone;
determining at least one parameter of each of the one or more planned resources, the at least one parameter including:
a power requirement of each of the one or more planned resources, and
a cooling requirement of each of the one or more planned resources; and
generating a view of the area showing possible locations to position the one or more planned resources including a recommended location to position the one or more planned resources, wherein the possible locations and the recommended location are determined based on the at least one parameter including the power requirement and the cooling requirement of the one or more planned resources and the characteristics of the area.

2. The method of claim 1, wherein the at least one parameter includes a physical space requirement of each of the one or more planned resources.

3. The method of claim 1, wherein the at least one parameter includes a weight requirement of each of the one or more planned resources.

4. The method of claim 1, wherein the area includes a site.

5. The method of claim 4, wherein the site includes at least one room.

6. The method of claim 4, wherein the site includes at least one floor of a building.

7. The method of claim 4, wherein the site includes a building.

8. The method of claim 1, wherein the possible locations to position the one or more planned resources include at least one cabinet.

9. The method of claim 1, wherein the possible locations to position the one or more planned resources include at least one floor.

10. The method of claim 1, wherein the possible locations to position the one or more planned resources include at least one wall.

11. The method of claim 1, wherein the possible locations to position the one or more planned resources include a location within the area where it is physically possible to place the one or more planned resources, based on the at least one parameter including the power requirement and the cooling requirement of the one or more planned resources.

12. The method of claim 1, further comprising displaying the view of the area showing the possible locations to position the one or more planned resources.

13. The method of claim 12, wherein displaying the possible locations includes displaying all possible locations where the one or more planned resources may be placed, based on the at least one parameter including the power requirement and the cooling requirement of the one or more planned resources and the characteristics of the area.

14. The method of claim 12, further comprising allowing a user to graphically position the one or more planned resources in the view of the area.

15. The method of claim 12, wherein the view of the area includes a 3-dimensional view of the area.

16. The method of claim 1, further comprising allowing a user to define the characteristics associated with the area.

17. The method of claim 1, wherein the view displays a current capacity usage.

18. The method of claim 17, further comprising generating a report of the current capacity usage.

19. The method of claim 1, wherein managing the area includes managing a capacity usage to reduce incidences of failed deployment.

20. The method of claim 1, further comprising generating a report of services affected by one or more failures.

21. The method of claim 1, wherein a user is capable of defining any site-based capacity to be controlled.

22. The method of claim 21, wherein the site-based capacity includes a zone type.

23. The method of claim 21, wherein the site-based capacity includes at least one of a behavior algorithm or capacity algorithm.

24. The method of claim 1, wherein the at least one parameter includes an ownership of the one or more planned resources.

25. The method of claim 1, wherein the plurality of zones includes one or more placement zones that each refer to a zone where one or more of the planned resources may be placed within the area, where the area includes a room of a building, and where the planned resources further include one or more end user computers, monitors, phones, power racks, fans, cooling devices, heating devices, and heat sinks.

26. The method of claim 1, wherein the plurality of zones includes one or more cooling zones that each refer to a zone where temperature is regulated within the area.

27. The method of claim 1, wherein the plurality of zones includes one or more fire protection zones that each refer to a zone demarcated for safety reasons within the area.

28. The method of claim 27, wherein the one or more fire protection zones include a subtype that indicates one or more rooms that need to be sealed off in case of a fire within the area.

29. The method of claim 1, wherein the plurality of zones includes one or more prohibited zones that each refer to a zone to remain vacant within the area.

30. The method of claim 1, wherein each of the plurality of zones of the area are placed in the area by a user utilizing an interface, where the user creates a perimeter for each of the plurality of zones by entering X axis and Y axis coordinates for each of the zones, utilizing the interface.

31. The method of claim 1, wherein one or more of the plurality of zones of the area are set as transparent, such that one or more other zones underlying the one or more zones set as transparent may be seen within the view of the area.

32. The method of claim 1, wherein the view includes a visualization of routes within a site with respect to the one or more planned resources and one or more boundaries.

33. A program product embodied on a computer readable medium, comprising:
    computer code for identifying one or more planned resources to be located in an area, the area having a plurality of characteristics including a plurality of zones, where:
        each of the plurality of zones has an enclosed perimeter represented by a single polygon within the area identifying a portion of the area into which a plurality of planned resources are to be placed, the planned resources including each of one or more racks, cabinets, desks, power supplies, and servers, and
        each of the plurality of zones has:
            settings defining planned resources that must be placed within the zone, planned resources that cannot be placed within the zone, and planned resources that may optionally be placed within the zone,
            settings defining one or more functions supplied to planned resources in the zone, and
            settings defining whether a resource overlapping the enclosed perimeter of the zone is prohibited by the zone
    computer code for determining at least one parameter of each of the one or more planned resources, the at least one parameter including:
        a power requirement of each of the one or more planned resources, and
        a cooling requirement of each of the one or more planned resources; and
    computer code for generating a view of the area showing possible locations to position the one or more planned resources including a recommended location to position the one or more planned resources, wherein the possible locations and the recommended location are determined based on the at least one parameter including the power requirement and the cooling requirement of the one or more planned resources and the characteristics of the area.

34. An apparatus, comprising:
    a processor for:
        identifying one or more planned resources to be located in an area, the area having a plurality of characteristics including a plurality of zones, where:
            each of the plurality of zones has an enclosed perimeter represented by a single polygon within the area identifying a portion of the area into which a plurality of planned resources are to be placed, the planned resources including each of one or more racks, cabinets, desks, power supplies, and servers, and
            each of the plurality of zones has:
                settings defining planned resources that must be placed within the zone, planned resources that cannot be placed within the zone, and planned resources that may optionally be placed within the zone,
                settings defining one or more functions supplied to planned resources in the zone, and settings defining whether a resource overlapping the enclosed perimeter of the zone is prohibited by the zone determining at least one parameter of each of the one or more planned resources, the at least one parameter including:
   a power requirement of each of the one or more planned resources, and
   a cooling requirement of each of the one or more planned resources; and generating a view of the area showing possible locations to position the one or more planned resources including a recommended location to position the one or more planned resources, wherein the possible locations and the recommended location are determined based on the at least one parameter including the power requirement and the cooling requirement of the one or more planned resources and the characteristics of the area.

35. The method of claim 34, wherein a first zone of the plurality of zones overlaps a second zone of the plurality of zones, and any of the one or more planned resource placed in a portion of the area where the first zone overlaps the second zone must satisfy restrictions of the first zone and restrictions of the second zone.

\* \* \* \* \*